(12) United States Patent
Wang et al.

(10) Patent No.: US 12,101,747 B2
(45) Date of Patent: Sep. 24, 2024

(54) COMMUNICATION METHOD AND APPARATUS

(71) Applicant: HUAWEI TECHNOLOGIES CO., LTD., Shenzhen (CN)

(72) Inventors: Lei Wang, Shanghai (CN); Yan Chen, Shanghai (CN); Xiuqiang Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 615 days.

(21) Appl. No.: 17/193,225

(22) Filed: Mar. 5, 2021

(65) Prior Publication Data

US 2021/0195568 A1 Jun. 24, 2021

Related U.S. Application Data

(63) Continuation of application No. PCT/CN2019/100742, filed on Aug. 15, 2019.

(30) Foreign Application Priority Data

Sep. 6, 2018 (CN) .......................... 201811039016.8

(51) Int. Cl.
*H04W 72/044* (2023.01)
*H04L 27/26* (2006.01)
*H04W 72/20* (2023.01)

(52) U.S. Cl.
CPC ....... *H04W 72/044* (2013.01); *H04L 27/2601* (2013.01); *H04W 72/20* (2023.01)

(58) Field of Classification Search
CPC ....... H04W 72/044; H04W 72/20; H04B 1/69
See application file for complete search history.

(56) References Cited

U.S. PATENT DOCUMENTS

2010/0085934 A1* 4/2010 Wang .................... H04L 5/0044
370/330
2014/0219317 A1 8/2014 Jeong
(Continued)

FOREIGN PATENT DOCUMENTS

CN 1627663 A 6/2005
CN 101374031 A 2/2009
(Continued)

OTHER PUBLICATIONS

CMCC, Considerations on Rel-15 NoMA usage scenarios, design targets and principles. 3GPP TSG RAN WG1 Meeting #92 Athens, Greece, Feb. 26, 2018, R1-1802047, 4 pages.
(Continued)

*Primary Examiner* — Donald L Mills
(74) *Attorney, Agent, or Firm* — Rimon PC

(57) ABSTRACT

This application discloses a communication method and an apparatus. A principle of the method is as follows: A spreading factor of a spreading block is adjusted based on available resource elements REs in a time-frequency resource block, then, the spreading block is generated by using the adjusted spreading factor, and finally, the generated spreading block is mapped to the available resource elements in the time-frequency resource block for sending. In this way, a requirement that "locations of spreading blocks of a plurality of users need to be aligned" can be satisfied, and no complex symbol is discarded, so that detection performance of the spreading blocks is ensured.

9 Claims, 18 Drawing Sheets

(56) References Cited

U.S. PATENT DOCUMENTS

| | | | | |
|---|---|---|---|---|
| 2018/0368139 A1* | 12/2018 | Han | ............... | H04L 1/1861 |
| 2019/0335423 A1* | 10/2019 | Wu | ............... | H04W 72/0453 |
| 2020/0106574 A1* | 4/2020 | Lee | ............... | H04L 1/0003 |
| 2020/0213032 A1* | 7/2020 | Yeo | ............... | H04L 5/0094 |

FOREIGN PATENT DOCUMENTS

| | | | |
|---|---|---|---|
| CN | 102404838 A | | 4/2012 |
| CN | 103107854 A | | 5/2013 |
| CN | 103220085 A | | 7/2013 |
| CN | 103458459 A | | 12/2013 |
| CN | 104168092 A | | 11/2014 |
| CN | 106850163 A | | 6/2017 |
| CN | 108111990 A | | 6/2018 |
| WO | 2013113140 A1 | | 8/2013 |
| WO | 2014053064 A1 | | 4/2014 |

OTHER PUBLICATIONS

Huawei, HiSilicon, Discussion on the design of SCMA. 3GPP TSG RAN WG1 Meeting #93, Busan, Korea, May 21, 2018, R1-1805907, 9 pages.

Nokia, Nokia Shanghai Bell, Considerations on NOMA Transmitter. 3GPP TSG-RAN WG1 Meeting 92 bis, Sanya, China, Apr. 16-20, 2018, R1-1804462, 4 pages.

* cited by examiner

S141: A terminal device determines a spreading block based on a first spreading factor M S142: When a ratio of M to N is less than a first threshold, the terminal device discards the spreading block

COMMUNICATION METHOD AND APPARATUS

CROSS-REFERENCE TO RELATED APPLICATIONS

This application is a continuation of International Application No. PCT/CN2019/100742, filed on Aug. 15, 2019, which claims priority to Chinese Patent Application No. 201811039016.8, filed on Sep. 6, 2018. The disclosures of the aforementioned applications are hereby incorporated by reference in their entireties.

TECHNICAL FIELD

This application relates to the field of communications technologies, and in particular, to a communication method and an apparatus.

BACKGROUND

A non-orthogonal multiple access (NOMA) technology is a multiple access technology that allows a plurality of terminal devices to send or receive data on a same time-frequency resource in a non-orthogonal manner. Compared with an orthogonal frequency division multiple access (OFDMA) technology, the non-orthogonal multiple access technology can be used to significantly improve a quantity of terminal devices that can simultaneously access a system, a throughput, spectral efficiency, and the like. Therefore, the non-orthogonal multiple access technology is considered as an important alternative multiple access technology in a 5th generation (5G) mobile communications system, and is being discussed in the 5G new radio (NR) standard currently.

SUMMARY

This application provides a communication method, an apparatus, and a computer-readable storage medium, to provide a solution for adjusting a spreading factor.

According to a first aspect, this application provides a communication method. The communication method includes: determining a spreading block based on a first spreading factor M, and sending the spreading block, where M is determined based on available resource elements REs in a time-frequency resource block, the time-frequency resource block is a resource block corresponding to a second spreading factor N, M and N are integers, M is less than N, and the spreading block is mapped to the available REs in the time-frequency resource block.

In this embodiment of this application, the time-frequency resource block corresponding to the second spreading factor N may have but is not limited to the following explanation:

A network device may configure the time-frequency resource block and the second spreading factor N for a terminal device, and the terminal device may determine one or more resource element (RE) groups in a time-frequency resource based on the second spreading factor N.

One resource element RE group may include N REs, the RE group may be used to map one spreading block whose length is N, and the RE group may also be referred to as the time-frequency resource block corresponding to the second spreading factor N.

In a possible implementation, when determining the resource element RE group based on the second spreading factor N, the terminal device may skip an unavailable RE of the terminal device, or may not skip an unavailable RE of the terminal device. That is, the RE group may include the unavailable RE. For the RE group including the unavailable RE, a quantity of available REs included in the RE group may be less than N. For example, when determining an RE group, a terminal device skips a common unavailable RE of all terminal devices, but does not skip a specific unavailable RE of a part of terminal devices. Alternatively, when determining an RE group, a target terminal device uses a manner of not skipping an unavailable RE.

In a possible implementation, the terminal device may determine the one or more RE groups in the time-frequency resource in a time-domain-first manner. For the time-domain-first manner, a quantity of available REs in time domain may not be exactly divided by N. Therefore, a quantity of REs included in a part of RE groups may be less than N. For example, REs in an RE group correspond to a same subcarrier.

In a possible implementation, the terminal device may determine the one or more RE groups in the time-frequency resource in a frequency-domain-first manner. Likewise, for the frequency-domain-first manner, a quantity of available REs in frequency domain may not be exactly divided by N. Therefore, a quantity of REs included in a part of RE groups may be less than N. For example, REs in an RE group correspond to a same symbol. In a possible implementation, M may be equal to a quantity of the available REs in the time-frequency resource block.

In a possible implementation, a ratio of M to N is greater than or equal to a first threshold, or M is less than or equal to N. The second spreading factor may be configured by the network device.

In this embodiment of this application, when the ratio of M to N is greater than or equal to the first threshold, it may be considered that there are a relatively large quantity of available resource elements REs in the time-frequency resource block currently. In this case, a spreading factor is adjusted to the first spreading factor M, so that demodulation performance of a non-orthogonal multiple access system can be ensured. Otherwise, when the ratio of M to N is less than the first threshold, a generated spreading block may be damaged distinctly, and demodulation performance may be affected. According to the method provided in this embodiment of this application, transmit power can be saved, and interference to another user can be reduced.

It can be learned that, in the implementations of the first aspect, the spreading factor is adjusted based on the available resource elements in the time-frequency resource block, and a first spreading block generated based on the adjusted spreading factor is sent. Compared with a solution in the prior art that a spreading block is generated directly by using a preconfigured spreading factor, the method can be used to ensure that complete time-frequency resource mapping can be performed on the generated spreading block, and a mapping location of the spreading block does not need to be changed, thereby further ensuring detection performance of the spreading block and reducing multi-user interference.

According to a second aspect, this application further provides a communication method, including: receiving a spreading block, where the spreading block is mapped to available resource elements REs in a time-frequency resource block, a spreading factor of the spreading block is a first spreading factor M, M is determined based on the available REs in the time-frequency resource block, the time-frequency resource block is a resource block corresponding to a second spreading factor N, M and N are integers, and M is less than N.

In a possible implementation, M may be equal to a quantity of the available REs in the time-frequency resource block. A ratio of M to N is greater than or equal to a first threshold, or M is less than or equal to N. The second spreading factor may be set based on a configuration of a network device.

According to a third aspect, this application provides a communication method, including: obtaining a second spreading block based on a second spreading factor N; discarding the second spreading block if a quantity of available resource elements REs in a time-frequency resource block is less than N; obtaining a first spreading block based on a first spreading factor M; and sending the first spreading block, where the first spreading block is mapped to the available REs in the time-frequency resource block, where M is determined based on the available REs in the time-frequency resource block, M and N are integers, M is less than N, and the time-frequency resource block is a resource block corresponding to the second spreading factor N.

In a possible implementation, M may be equal to the quantity of the available REs in the time-frequency resource block. A ratio of M to N is greater than or equal to a first threshold, or M is less than or equal to N. The second spreading factor may be configured by a network device.

It can be learned that, in the implementation of the third aspect, the second spreading block is generated based on the second spreading factor. If complete time-frequency resource mapping may be performed on the second spreading block, the second spreading block is sent; otherwise, the second spreading block is discarded, a spreading factor is re-adjusted based on the available resource elements in the time-frequency resource block, to obtain the first spreading factor, and the first spreading block generated based on the first spreading factor is sent. Compared with a solution in the prior art that a spreading block is generated directly by using a preconfigured spreading factor, the method can be used to ensure that complete time-frequency resource mapping can be performed on the generated spreading block, thereby further ensuring detection performance of the spreading block and reducing multi-user interference.

According to a fourth aspect, this application provides a communication method. The communication method includes: receiving a first spreading block, where the first spreading block is mapped to available resource elements REs in a time-frequency resource block, a spreading factor of the first spreading block is a second spreading factor M, M is determined based on the available REs in the time-frequency resource block, the time-frequency resource block is a resource block corresponding to a second spreading factor N, M and N are integers, and M is less than N.

In a possible implementation, M may be equal to a quantity of the available REs in the time-frequency resource block. A ratio of M to N is greater than or equal to a first threshold, or M is less than or equal to N. The second spreading factor may be configured by a network device.

According to a fifth aspect, a communication method is provided, and includes: sending a spreading block, where the spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer.

In a possible implementation, the first direction is a frequency domain increasing direction, and the second direction is a frequency domain decreasing direction; or the first direction is a frequency domain decreasing direction, and the second direction is a frequency domain increasing direction.

In a possible implementation, the third direction is a time domain increasing direction, and the fourth direction is a time domain decreasing direction; or the third direction is a time domain decreasing direction, and the fourth direction is a time domain increasing direction.

It can be learned that in the implementations provided in the fifth aspect, it can be ensured that available resource elements on the $i^{th}$ OFDM symbol and the $(i+1)^{th}$ OFDM symbol to which the spreading block is mapped are adjacent, so that a requirement of "mapping complex symbols in a same spreading block in an orthogonal frequency division multiplexing system to adjacent resource elements" can be satisfied.

Because channel features of the adjacent resource elements are similar, spreading performance of the spreading block can be ensured by using the implementations provided in the fifth aspect.

According to a sixth aspect, a communication method is provided, and may include: receiving a spreading block, where the spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer.

In a possible implementation, the first direction is a frequency domain increasing direction, and the second direction is a frequency domain decreasing direction; or the first direction is a frequency domain decreasing direction, and the second direction is a frequency domain increasing direction.

In a possible implementation, the third direction is a time domain increasing direction, and the fourth direction is a time domain decreasing direction; or the third direction is a time domain decreasing direction, and the fourth direction is a time domain increasing direction.

Based on the inventive concept of the first aspect, according to a seventh aspect, this application provides an apparatus. The apparatus may be a network device, or may be an apparatus (for example, a chip) that can support a network device in implementing the method in the first aspect. Alternatively, the apparatus may be a terminal device, or may be an apparatus (for example, a chip) that can support a terminal device in implementing the method in the first aspect. The apparatus may include:
- a processing unit, configured to determine a spreading block based on a first spreading factor M, where M is determined based on available resource elements REs in a time-frequency resource block, the time-frequency resource block is a resource block corresponding to a second spreading factor N, M and N are integers, and M is less than N; and
- a transceiver unit, configured to send the spreading block, where the spreading block is mapped to the available REs in the time-frequency resource block.

In a possible implementation, for a value of M, refer to the record in the first aspect. This is not specifically limited herein again.

In a possible implementation, for comparison between M and N, refer to the record in the first aspect. This is not specifically limited herein again.

In a possible implementation, the transceiver unit is further configured to send configuration information. For description of the configuration information, refer to the record of the first aspect. This is not specifically limited herein again.

Based on the inventive concept of the first aspect, according to an eighth aspect, this application provides an apparatus. The apparatus may be a network device, or may be an apparatus (for example, a chip) that can support a network device in implementing the method in the first aspect. Alternatively, the apparatus may be a terminal device, or may be an apparatus (for example, a chip) that can support a terminal device in implementing the method in the first aspect. The apparatus may include:
- a communications interface;
- a memory, configured to store a program instruction; and
- a processor, configured to invoke and execute the program instruction stored in the memory, to implement the following function: determining a spreading block based on a first spreading factor M, and sending the spreading block by using the communications interface.

The spreading block is mapped to available resource elements REs in a time-frequency resource block, a spreading factor of the spreading block is the first spreading factor M, M is determined based on the available REs in the time-frequency resource block, the time-frequency resource block is a resource block corresponding to a second spreading factor N, M and N are integers, and M is less than N.

In a possible implementation, for a value of M, refer to the record in the first aspect. This is not specifically limited herein again.

In a possible implementation, for comparison between M and N, refer to the record in the first aspect. This is not specifically limited herein again.

In a possible implementation, the processor is further configured to send configuration information by using the communications interface. For description of the configuration information, refer to the record of the first aspect. This is not specifically limited herein again.

Based on the inventive concept of the second aspect, according to a ninth aspect, this application provides an apparatus. The apparatus may be a network device, or may be an apparatus (for example, a chip) that can support a network device in implementing the method in the second aspect. Alternatively, the apparatus may be a terminal device, or may be an apparatus (for example, a chip) that can support a terminal device in implementing the method in the second aspect. The apparatus may include:
- a transceiver unit, configured to receive a spreading block, where the spreading block is mapped to available resource elements REs in a time-frequency resource block, a spreading factor of the spreading block is a first spreading factor M, M is determined based on the available REs in the time-frequency resource block, the time-frequency resource block is a resource block corresponding to a second spreading factor N, M and N are integers, and M is less than N; and
- a processing unit, configured to process the received spreading block, for example, perform processing such as despreading or demodulation.

In a possible implementation, for a value of M, refer to the record in the second aspect. This is not specifically limited herein again.

In a possible implementation, for comparison between M and N, refer to the record in the second aspect. This is not specifically limited herein again.

In a possible implementation, the transceiver unit is further configured to receive configuration information; and the processing unit is further configured to configure the second spreading factor N based on the configuration information.

Based on the inventive concept of the second aspect, according to a tenth aspect, this application provides an apparatus. The apparatus may be a network device, or may be an apparatus (for example, a chip) that can support a network device in implementing the method in the second aspect. Alternatively, the apparatus may be a terminal device, or may be an apparatus (for example, a chip) that can support a terminal device in implementing the method in the second aspect. The apparatus may include:
- a communications interface;
- a memory, configured to store a program instruction; and
- a processor, configured to invoke and execute the program instruction stored in the memory, to implement the following function: receiving a spreading block by using the communications interface, and processing the spreading block.

The spreading block is mapped to available resource elements REs in a time-frequency resource block, a spreading factor of the spreading block is a first spreading factor M, M is determined based on the available REs in the time-frequency resource block, the time-frequency resource block is a resource block corresponding to a second spreading factor N, M and N are integers, and M is less than N.

In a possible implementation, for a value of M, refer to the record in the second aspect. This is not specifically limited herein again.

In a possible implementation, for comparison between M and N, refer to the record in the second aspect. This is not specifically limited herein again.

In a possible implementation, the processor is further configured to receive configuration information by using the communications interface; and the processor is further configured to configure the second spreading factor N based on the configuration information.

Based on the inventive concept of the third aspect, according to an eleventh aspect, this application provides an apparatus. The apparatus may be a network device, or may be an apparatus (for example, a chip) that can support a network device in implementing the method in the third aspect. Alternatively, the apparatus may be a terminal device, or may be an apparatus (for example, a chip) that can support a terminal device in implementing the method in the third aspect. The apparatus may include:

a processing unit, configured to: obtain a second spreading block based on a second spreading factor N, discard the second spreading block when a quantity of available resource elements REs in a time-frequency resource block is less than N, and obtain a first spreading block based on a first spreading factor M, where the time-frequency resource block is a resource block corresponding to the second spreading factor N, M is determined based on the available REs in the time-frequency resource block, M and N are integers, and M is less than N; and a transceiver unit, configured to send the first spreading block, where the first spreading block is mapped to the available REs in the time-frequency resource block.

In a possible implementation, for a value of M, refer to the record in the third aspect. This is not specifically limited herein again.

In a possible implementation, for comparison between M and N, refer to the record in the third aspect. This is not specifically limited herein again.

In a possible implementation, the transceiver unit is further configured to send configuration information. For a function of the configuration information, refer to the record in the third aspect. This is not specifically limited herein again.

Based on the inventive concept of the third aspect, according to a twelfth aspect, this application provides an apparatus. The apparatus may be a network device, or may be an apparatus (for example, a chip) that can support a network device in implementing the method in the third aspect. Alternatively, the apparatus may be a terminal device, or may be an apparatus (for example, a chip) that can support a terminal device in implementing the method in the third aspect. The apparatus may include:

a communications interface;

a memory, configured to store a program instruction; and a processor, configured to invoke and execute the program instruction stored in the memory, and receive and/or send data by using the communications interface, to implement the following function: obtaining a second spreading block based on a second spreading factor N, discarding the second spreading block if a quantity of available resource elements REs in a time-frequency resource block is less than N, obtaining a first spreading block based on a first spreading factor M, and receiving the first spreading block by using the communications interface.

The time-frequency resource block is a resource block corresponding to the second spreading factor N, M is determined based on the available REs in the time-frequency resource block, M and N are integers, and M is less than N.

In a possible implementation, for a value of M, refer to the record in the third aspect. This is not specifically limited herein again.

In a possible implementation, for comparison between M and N, refer to the record in the third aspect. This is not specifically limited herein again.

In a possible implementation, the processor is further configured to send configuration information by using the communications interface. For description of the configuration information, refer to the record in the third aspect. This is not specifically limited herein again. Based on the inventive concept of the fourth aspect, according to a thirteenth aspect, this application provides an apparatus. The apparatus may be a network device, or may be an apparatus (for example, a chip) that can support a network device in implementing the method in the fourth aspect. Alternatively, the apparatus may be a terminal device, or may be an apparatus (for example, a chip) that can support a terminal device in implementing the method in the fourth aspect. The apparatus may include:

a transceiver unit, configured to receive a first spreading block; and a processing unit, configured to process the first spreading block.

The first spreading block is mapped to available resource elements REs in a time-frequency resource block, a spreading factor of the first spreading block is a second spreading factor M, M is determined based on the available REs in the time-frequency resource block, the time-frequency resource block is a resource block corresponding to a second spreading factor N, M and N are integers, and M is less than N.

The processing unit is configured to process the first spreading block, for example, perform processing such as despreading and demodulation.

In a possible implementation, for a value of M, refer to the record in the fourth aspect. This is not specifically limited herein again.

In a possible implementation, for comparison between M and N, refer to the record in the fourth aspect. This is not specifically limited herein again.

In a possible implementation, the transceiver unit is further configured to receive configuration information; and the processing unit is further configured to configure the second spreading factor N based on the configuration information.

Based on the inventive concept of the fourth aspect, according to a fourteenth aspect, this application provides an apparatus. The apparatus may be a network device, or may be an apparatus (for example, a chip) that can support a network device in implementing the method in the fourth aspect. Alternatively, the apparatus may be a terminal device, or may be an apparatus (for example, a chip) that can support a terminal device in implementing the method in the fourth aspect. The apparatus may include:

a communications interface;

a memory, configured to store a program instruction; and a processor, configured to invoke and execute the program instruction stored in the memory, and receive and/or send data by using the communications interface, to implement the following function: receiving a first spreading block by using the communications interface, and processing (for example, demodulating or despreading) the first spreading block.

In a possible implementation, for a value of M, refer to the record in the fourth aspect. This is not specifically limited herein again.

In a possible implementation, for comparison between M and N, refer to the record in the fourth aspect. This is not specifically limited herein again.

In a possible implementation, the processor is further configured to receive configuration information by using the communications interface, and configure a second spreading factor N based on the configuration information.

Based on the inventive concept of the fifth aspect, according to a fifteenth aspect, this application provides an apparatus. The apparatus may be a network device, or may be an apparatus (for example, a chip) that can support a network device in implementing the method in the fifth aspect. Alternatively, the apparatus may be a terminal device, or may be an apparatus (for example, a chip) that can support a terminal device in implementing the method in the fifth aspect. The apparatus may include:

a processing unit, configured to generate a spreading block; and a transceiver unit, configured to send the spreading block, where the spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer.

For descriptions of the first direction, the second direction, the third direction, or the fourth direction, refer to the descriptions in the fifth aspect. This is not specifically limited herein again.

Based on the inventive concept of the fifth aspect, according to a sixteenth aspect, this application provides an apparatus. The apparatus may be a network device, or may be an apparatus (for example, a chip) that can support a network device in implementing the method in the fifth aspect. Alternatively, the apparatus may be a terminal device, or may be an apparatus (for example, a chip) that can support a terminal device in implementing the method in the fifth aspect. The apparatus may include:

a communications interface;

a memory, configured to store a program instruction; and a processor, configured to invoke and execute the program instruction stored in the memory, and receive and/or send data by using the communications interface, to implement the following function: generating a spreading block, and sending the spreading block by using the communications interface.

The spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer.

For descriptions of the first direction, the second direction, the third direction, or the fourth direction, refer to the record in the fifth aspect. This is not specifically limited herein again.

Based on the inventive concept of the sixth aspect, according to a seventeenth aspect, this application provides an apparatus. The apparatus may be a network device, or may be an apparatus (for example, a chip) that can support a network device in implementing the method in the sixth aspect. Alternatively, the apparatus may be a terminal device, or may be an apparatus (for example, a chip) that can support a terminal device in implementing the method in the sixth aspect. The apparatus may include:

a transceiver unit, configured to receive a spreading block, where the spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer; and a processing unit, configured to process the spreading block.

For descriptions of the first direction, the second direction, the third direction, or the fourth direction, refer to the record in the sixth aspect. This is not specifically limited herein again.

Based on the inventive concept of the sixth aspect, according to an eighteenth aspect, this application provides an apparatus. The apparatus may be a network device, or may be an apparatus (for example, a chip) that can support a network device in implementing the method in the sixth aspect. Alternatively, the apparatus may be a terminal device, or may be an apparatus (for example, a chip) that can support a terminal device in implementing the method in the sixth aspect. The apparatus may include:

a communications interface;

a memory, configured to store a program instruction; and a processor, configured to invoke and execute the program instruction stored in the memory, and receive and/or send data by using the communications interface, to implement the following function: receiving a spreading block by using the communications interface, and processing the spreading block.

The spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer.

For descriptions of the first direction, the second direction, the third direction, or the fourth direction, refer to the record in the sixth aspect. This is not specifically limited herein again.

According to a nineteenth aspect, this application provides a computer storage medium. The computer medium stores a computer instruction. When run on a computer, the computer instruction enables the computer to perform the method according to any one of the first aspect to the sixth aspect.

According to a twentieth aspect, this application provides a computer program. The computer program includes a computer instruction, and when the computer instruction is executed by a computer, the computer is enabled to perform the method according to any one of the first aspect to the sixth aspect.

According to a twentieth-first aspect, this application provides a computer program product including an instruction. When running on a computer, the computer program product enables the computer to perform the method according to any one of the first aspect to the sixth aspect.

According to a twenty-second aspect, an embodiment of this application provides a chip system. The chip system includes a processor, may further include a memory, and is configured to implement the method according to any one of the first aspect to the sixth aspect.

According to a twenty-third aspect, this application provides a communications system, including the apparatus according to any one of the seventh aspect to the eighteenth aspect.

DESCRIPTION OF EMBODIMENTS

Figure 1:
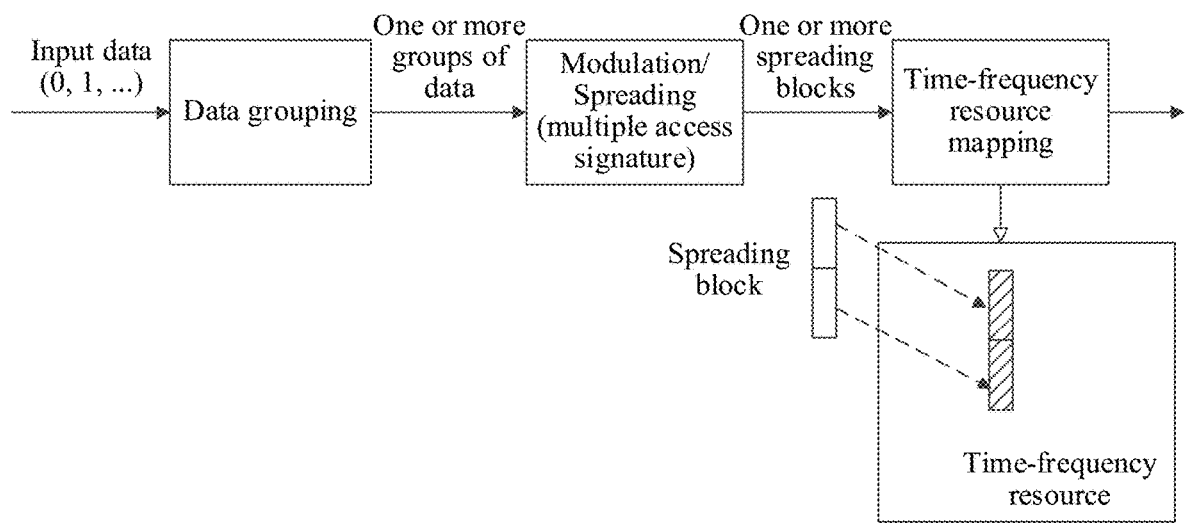
FIG. 1 shows a procedure in which a transmit end sends data by using a non-orthogonal multiple access technology according to an embodiment of this application.

For ease of understanding, descriptions of concepts related to embodiments of this application are provided as examples for reference, as shown in the following:

(1) A non-orthogonal multiple access (NOMA) technology is a multiple access technology that allows a plurality of terminal devices to send or receive data on a same time-frequency resource. For a NOMA system, the plurality of terminal devices may simultaneously transmit the data on the same time-frequency resource. To enable a receive end to distinguish signals of the plurality of terminal devices, the system allocates a NOMA multiple access signature (MA signature) to each terminal device. Certainly, in the embodiments of this application, the terminal device may alternatively independently select the NOMA multiple access signature. Specifically, in uplink transmission, each terminal device may perform operations such as spreading and modulation on input data based on the respective multiple access signature, and send the data on which spreading and modulation are performed. In downlink transmission, each terminal device may perform operations such as despreading and demodulation on received data based on the respective multiple access signature.

Non-orthogonal multiple access in the embodiments of this application may include but is not limited to the following technologies: sparse code multiple access (SCMA), multi-user shared access (MUSA), pattern division multiple access (PDMA), interleave-grid multiple access (IGMA), resource spreading multiple access (RSMA), non-orthogonal coded multiple access (NCMA), non-orthogonal coded access (NOCA), and the like.

(2) A multiple access signature is also referred to as a NOMA signature or a NOMA multiple access signature. Various types of non-orthogonal multiple access technologies may correspond to corresponding multiple access signatures.

(3) A complex symbol may be represented in a form of a+bj. a is a real part, b is an imaginary part, and j is an imaginary unit. In the complex symbol in the embodiments of this application, values of a and b may be both non-zero, or a value of a is zero, and a value of b is non-zero, or a value of a is non-zero, and a value of b is zero, or values of a and b are both zero.

(4) A network device may be a device that is in a network and that connects a terminal device to a wireless network. The network device may be a node in a radio access network, a base station, or a radio access network (RAN) node (or device). Currently, some examples of the network device are: a gNB, a transmission reception point (TRP), an evolved NodeB (eNB), a home base station (for example, a home evolved NodeB or a home Node B, HNB), a base band unit (BBU), or a Wi-Fi access point (AP). In addition, in a network structure, the network device may include a centralized unit (CU) node and a distributed unit (DU) node. In such a structure, protocol layers of an eNB in a long term evolution (LTE) system are split, where functions of some protocol layers are centrally controlled by a CU, functions of some or all of remaining protocol layers are distributed in DUs, and the CU centrally controls the DUs.

5. A terminal device includes user equipment (UE), a mobile station (MS), a mobile terminal (MT), or the like, and is a device that provides voice and/or data connectivity for a user, for example, a handheld device or a vehiclemounted device that has a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

In addition, it should be understood that, in the description of this application, terms such as "first" and "second" are merely used for distinction and description, but cannot be understood as an indication or implication of relative importance, and cannot be understood as an indication or implication of a sequence.

The following describes technical solutions in this application with reference to the accompanying drawings.

As shown in FIG. 1, this application provides an application scenario. The application scenario may be an example of performing communication by using a non-orthogonal multiple access technology. The scenario shown in FIG. 1 is merely an example for description, and is not intended to limit the technical solutions in this application.

As shown in FIG. 1, if two devices communicate with each other by using the non-orthogonal multiple access technology, a data processing process of a transmit end is usually as follows: First, input data is grouped, to obtain one or more groups of data. For each group of data, a multiple access signature may be used. Modulation and spreading are performed on each group of data, to obtain a spreading block. Each group of data corresponds to one spreading block, and a plurality of groups of data correspond to a plurality of spreading blocks. Finally, time-frequency resource mapping is performed on each spreading block, and the spreading block is sent to a receive end. For example, every two bits of input data may be divided into one group. That is, one group of data includes two bits. Then, modulation and spreading are performed on one group of data, to obtain four complex symbols that are included in one spreading block. A length of the spreading block may be referred to as a value of a spreading factor (SF). For example, if a length of a spreading block is four, and includes four complex symbols, a value of a spreading factor SF corresponding to the spreading block may be four.

In this embodiment of this application, for example, for a sparse code multiple access SCMA technology, two factors of determining a multiple access signature of the SCMA technology are a sparse pattern and a value set of non-zero locations in the sparse pattern. In other words, the multiple access signature of the sparse code multiple access SCMA technology is determined based on the sparse pattern and a preset value set of the non-zero locations in the sparse pattern. For example, for a sparse code whose length is 4 and whose sparsity is 50%, there may be the following six sparse patterns in total:

$$\begin{bmatrix}1\\1\\0\\0\end{bmatrix},\begin{bmatrix}0\\0\\1\\1\end{bmatrix},\begin{bmatrix}1\\0\\1\\0\end{bmatrix},\begin{bmatrix}0\\1\\0\\1\end{bmatrix},\begin{bmatrix}1\\0\\0\\1\end{bmatrix},\begin{bmatrix}0\\1\\1\\0\end{bmatrix}.$$

A value of a non-zero location in the sparse pattern may be generated based on a value of an input data bit and a predefined stipulation. For example, if four bits are one group, a relationship between input data bits and the value of the non-zero location may be determined according to a stipulation in the following Table 1:

TABLE 1

| Input data bits | Value of a non-zero location |
|---|---|
| 0000 | $\begin{bmatrix}3+3j\\1+j\end{bmatrix}$ |
| 0001 | $\begin{bmatrix}-1+3j\\3+j\end{bmatrix}$ |
| 0010 | $\begin{bmatrix}1+3j\\-3+j\end{bmatrix}$ |
| 0011 | $\begin{bmatrix}-3+3j\\-1+j\end{bmatrix}$ |
| 0100 | $\begin{bmatrix}3-j\\1+3j\end{bmatrix}$ |
| 0101 | $\begin{bmatrix}-1-j\\3+3j\end{bmatrix}$ |
| 0110 | $\begin{bmatrix}1-j\\-3+3j\end{bmatrix}$ |
| 0111 | $\begin{bmatrix}-3-j\\-1+3j\end{bmatrix}$ |
| 1000 | $\begin{bmatrix}3+j\\1-3j\end{bmatrix}$ |
| 1001 | $\begin{bmatrix}-1+j\\3-3j\end{bmatrix}$ |
| 1010 | $\begin{bmatrix}1+j\\-3-3j\end{bmatrix}$ |
| 1011 | $\begin{bmatrix}-3+j\\-1-3j\end{bmatrix}$ |
| 1100 | $\begin{bmatrix}3-3j\\1-j\end{bmatrix}$ |
| 1101 | $\begin{bmatrix}-1-3j\\3-j\end{bmatrix}$ |
| 1110 | $\begin{bmatrix}1-3j\\-3-j\end{bmatrix}$ |
| 1111 | $\begin{bmatrix}-3-3j\\-1-j\end{bmatrix}$ |

It should be noted that Table 1 is merely an example for description, and does not constitute a limitation on a definition of SCMA. For different users, correspondences between a data bit and a value of a non-zero location may be the same, or may be different.

For another example, for multiple access technologies such as multi-user shared access MUSA, pattern division multiple access PDMA, non-orthogonal coded access NOCA, non-orthogonal coded multiple access NCMA, and resource spread multiple access RSMA, a linear spreading sequence may be used as a multiple access signature.

Specifically, after constellation modulation (or referred to as constellation mapping) is performed on an input data bit group, spreading may be performed by using the linear spreading sequence, and a modulated symbol obtained through constellation modulation is multiplied by the linear spreading sequence to generate an output symbol sequence. A spreading factor may be equal to a length of the linear spreading sequence. For example, a modulated symbol obtained by performing constellation modulation on an input data bit is $\alpha$. If a spreading sequence is $$\begin{bmatrix} 1 \\ -1 \\ -1 \\ 1 \end{bmatrix},$$

an output symbol sequence obtained through spreading may be $$a * \begin{bmatrix} 1 \\ -1 \\ -1 \\ 1 \end{bmatrix} = \begin{bmatrix} a \\ -a \\ -a \\ a \end{bmatrix}.$$

For another example, for interleave-grid multiple access IGMA, a grid mapping pattern may be used as a multiple access signature. A spreading factor is equal to a length of the grid mapping pattern. For example, for a grid mapping pattern whose length is 4 and whose sparsity of 0.5, there may be the following six grid mapping patterns:

$$\begin{bmatrix} 1 \\ 1 \\ 0 \\ 0 \end{bmatrix}, \begin{bmatrix} 0 \\ 0 \\ 1 \\ 1 \end{bmatrix}, \begin{bmatrix} 1 \\ 0 \\ 1 \\ 0 \end{bmatrix}, \begin{bmatrix} 0 \\ 1 \\ 0 \\ 1 \end{bmatrix}, \begin{bmatrix} 1 \\ 0 \\ 0 \\ 1 \end{bmatrix}, \begin{bmatrix} 0 \\ 1 \\ 1 \\ 0 \end{bmatrix}$$

In this embodiment of this application, when one of the grid mapping patterns is used as a multiple access signature to process data, a modulated symbol obtained through constellation modulation is mapped to each non-zero location in the grid mapping pattern. For example, when the grid mapping pattern $$\begin{bmatrix} 1 \\ 1 \\ 0 \\ 0 \end{bmatrix}$$

is used, modulated symbols $\alpha$ and $\beta$ obtained by performing constellation modulation on data bits are respectively mapped to non-zero locations in the grid mapping pattern. That is, an output symbol sequence after mapping is $$\begin{bmatrix} \alpha \\ \beta \\ 0 \\ 0 \end{bmatrix}.$$

It should be noted that in this embodiment of this application, multiple access signatures of different users may be orthogonal or may not be orthogonal. Whether two multiple access signatures are orthogonal may be defined in the following manners:

Definition 1: If a product of a multiple access signature A and a conjugate transpose of a multiple access signature B is zero, it may be considered that the multiple access signature A is orthogonal to the multiple access signature B; otherwise, it is considered that the multiple access signature A is not orthogonal to the multiple access signature B.

Definition 2: If a product of a conjugate transpose of a multiple access signature A and a multiple access signature B is zero, it is also considered that the multiple access signature A is orthogonal to the multiple access signature B; otherwise, it is considered that the multiple access signature A is not orthogonal to the multiple access signature B.

Figure 2A:
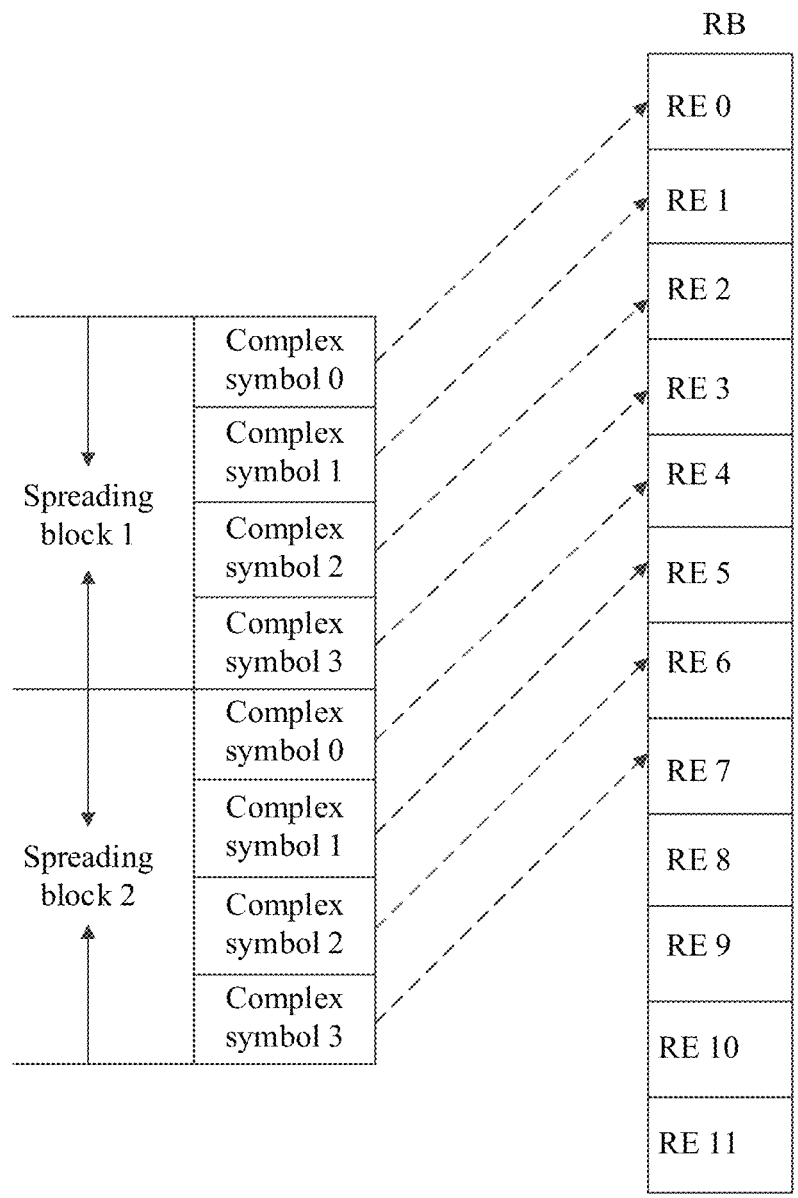
FIG. 2a, FIG. 2b, and FIG. 2c each are a schematic diagram of time-frequency resource mapping according to an embodiment of this application.
Figure 2B:
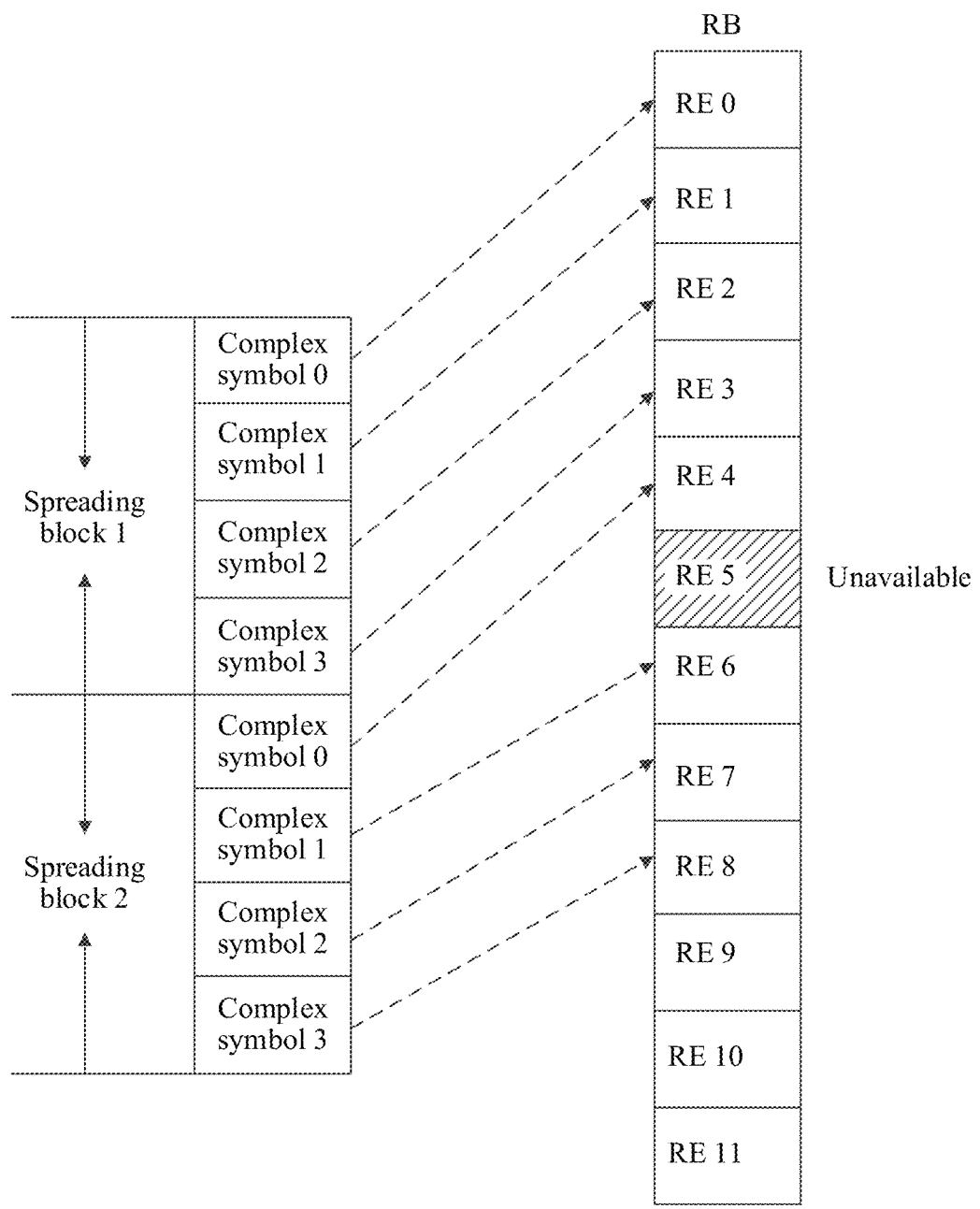

For example, in sparse code multiple access SCMA, multiple access signatures (also referred to as sparse patterns)

$$\begin{bmatrix} 1 \\ 1 \\ 0 \\ 0 \end{bmatrix} \text{ and } \begin{bmatrix} 0 \\ 0 \\ 1 \\ 1 \end{bmatrix}$$

are orthogonal to each other, and multiple access signatures $$\begin{bmatrix} 1 \\ 1 \\ 0 \\ 0 \end{bmatrix} \text{ and } \begin{bmatrix} 1 \\ 0 \\ 1 \\ 0 \end{bmatrix}$$

are not orthogonal to each other. In multi-user shared access MUSA, multiple access signatures (also referred to as linear spreading sequences)

$$\begin{bmatrix} 1 \\ 1 \\ j \\ -j \end{bmatrix} \text{ and } \begin{bmatrix} 1 \\ 1 \\ -j \\ j \end{bmatrix}$$

are orthogonal to each other, and $$\begin{bmatrix} 1 \\ 1 \\ j \\ -j \end{bmatrix} \text{ and } \begin{bmatrix} 1 \\ -1 \\ -1 \\ 1 \end{bmatrix}$$

are not orthogonal to each other. Specifically, still referring to FIG. 1, when time-frequency resource mapping is performed on a spreading block, usually, a complex symbol in the spreading block is used as a unit. Generally, a complex symbol is mapped to a resource element (RE) in a time-frequency resource. For example, as shown in FIG. 2a, FIG. 2b, FIG. 2c, or FIG. 3, one resource block (RB) is pre-allocated for data transmission. The RB may include twelve REs. After performing spreading and modulation on the input data, the transmit end may obtain two spreading blocks, and each spreading block includes four complex symbols. In a normal case, as shown in FIG. 2a, a complex symbol 0 to a complex symbol 3 in a spreading block 1 may be mapped to an RE 0 to an RE 3 respectively, and a complex symbol 0 to a complex symbol 3 in a spreading block 2 may be mapped to an RE 4 to an RE 7 respectively. However, if one of the RE 0 to the RE 7 is unavailable, the following two solutions may be used:

A first solution: Skip the unavailable RE. As shown in FIG. 2b, it is assumed that the RE 5 is unavailable. In this case, the complex symbol 0 to the complex symbol 3 in the spreading block 1 may also be mapped to the RE 0 to the RE 3. For the spreading block 2, the complex symbol 0 may be mapped to the RE 4, and the complex symbol 1 to the complex symbol 3 may be mapped to the RE 6 to an RE 8 respectively. It can be learned that, for the spreading block 2, the complex symbols included in the spreading block 2 are mapped to the RE 4, the RE 6, the RE 7, and the RE 8 respectively. In a non-orthogonal multiple access technology, a plurality of transmit ends send spreading blocks on the RE 4 to the RE 7. If a time-frequency resource of a spreading block of one transmit end is adjusted to the RE 4, the RE 6, the RE 7, and the RE 8 only because the RE 5 of the transmit end is unavailable, a requirement that "locations of spreading blocks of a plurality of users need to be aligned" in the non-orthogonal multiple access technology cannot be satisfied.

Figure 2C:
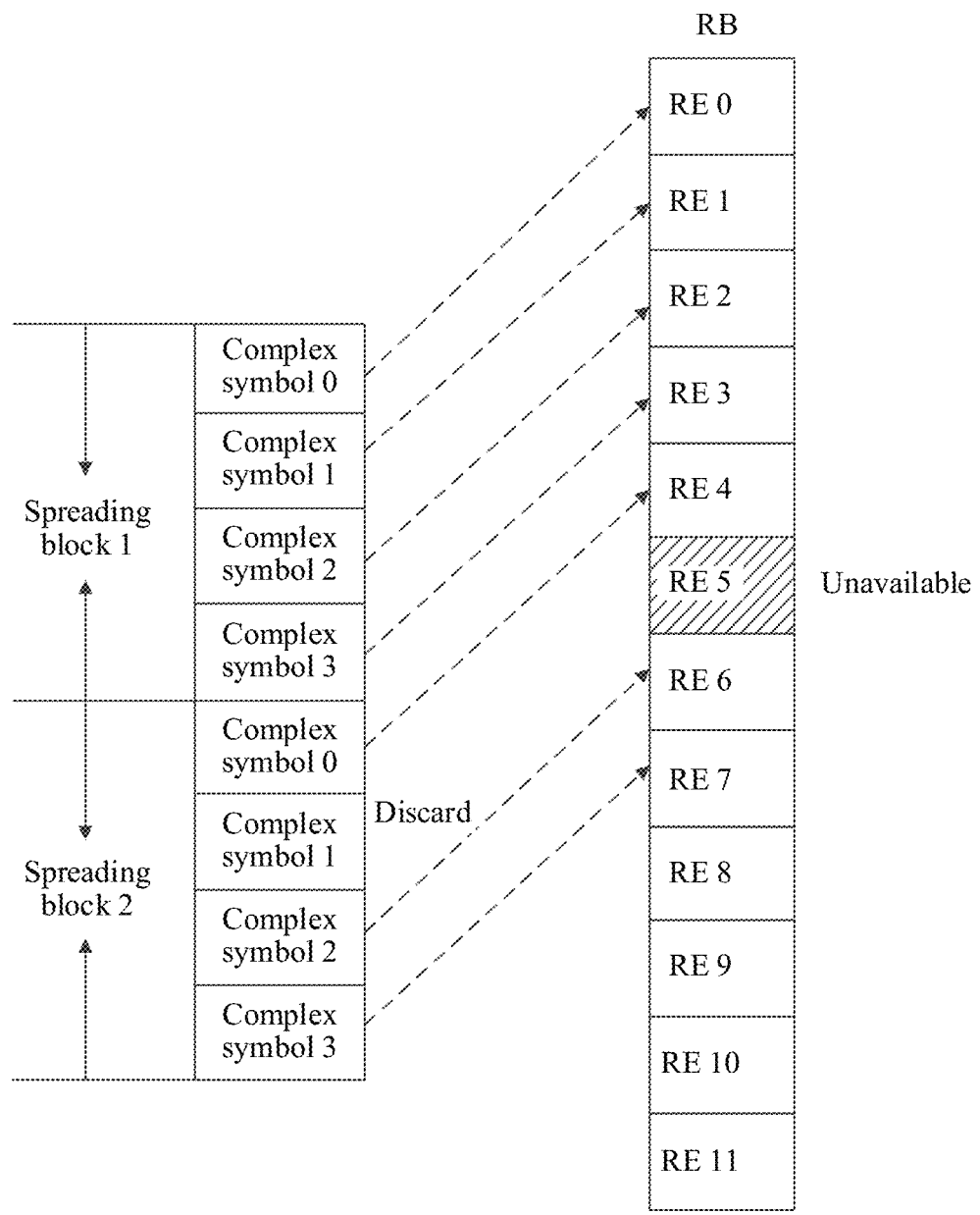

A second solution: Discard a complex symbol that should have been mapped to the unavailable RE, which is also referred to as puncturing. As shown in FIG. 2c, it is assumed that the RE 5 is unavailable. In this case, the complex symbol 0 to the complex symbol 3 in the spreading block 1 may also be mapped to the RE 0 to the RE 3. The complex symbol 0 in the spreading block 2 is mapped to the RE 4, the complex symbol 2 and the complex symbol 3 in the spreading block 2 are mapped to the RE 6 and the RE 7 respectively, and the complex symbol 1 in the spreading block 2 is discarded. Because the complex symbol 1 is discarded, detection performance of the spreading block deteriorates, and overall performance is affected.

Based on the foregoing description, this application provides a communication method. A principle of the method is as follows: A spreading factor of a spreading block is adjusted based on available resource elements REs in a time-frequency resource block, the spreading block is generated by using the adjusted spreading factor, and the generated spreading block is mapped to the available resource elements in the time-frequency resource block for sending. In this way, a requirement that "locations of spreading blocks of a plurality of users need to be aligned" can be satisfied, and no complex symbol is discarded, so that detection performance of the spreading blocks is ensured.

Figure 3:
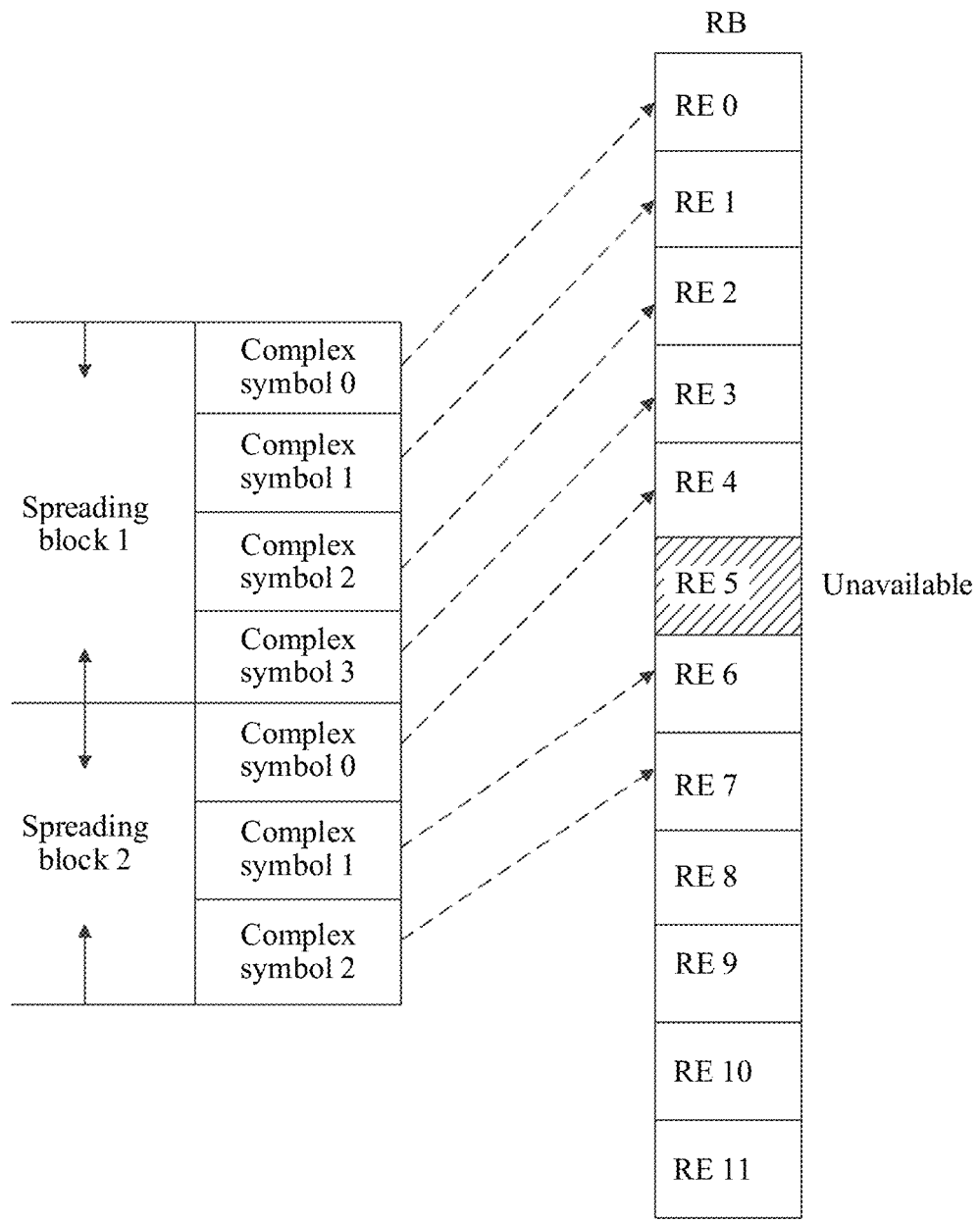
FIG. 3 is another schematic diagram of time-frequency resource mapping according to an embodiment of this application.

For example, the examples in FIG. 2b and FIG. 2c are still used. As shown in FIG. 3, it is assumed that a resource element RE 5 in the time-frequency resource block RB is unavailable. In this case, the spreading factor may be adjusted to 3, and then the spreading block 2 is generated by using the spreading factor 3. Finally, the complex symbols in the spreading block 2 are mapped to the RE 4, the RE 6, and the RE 7 respectively. In this way, an alignment requirement (in the NOMA technology, an RE boundary when each user sends the spreading block 2 cannot exceed the RE 7, or each user sends the spreading block 2 on the RE 4 to the RE 7) when a plurality of users send spreading blocks 2 can be satisfied, and no complex symbol is discarded, so that performance of the spreading block is ensured.

Figure 4:
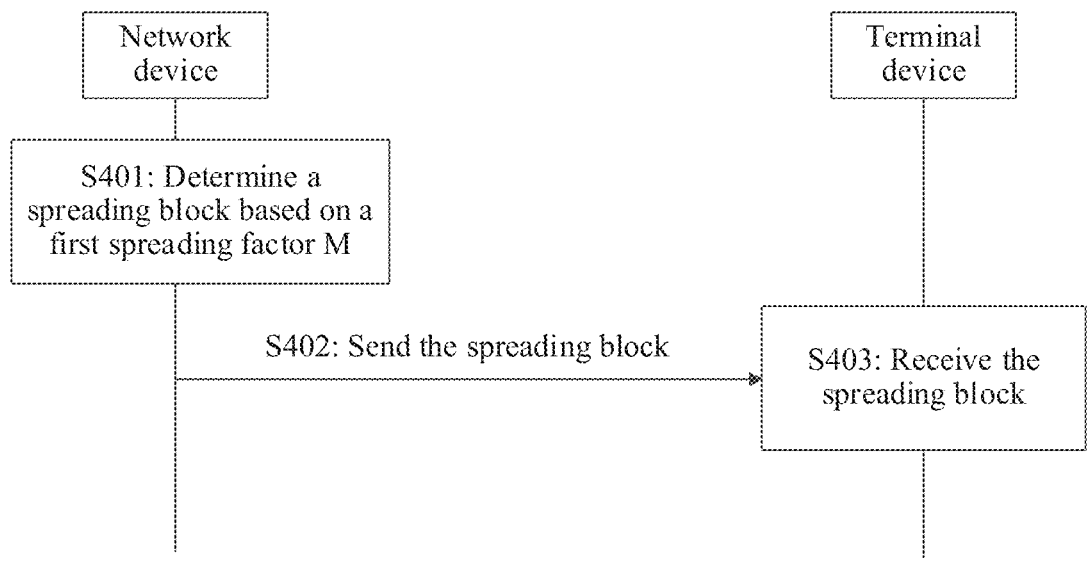
FIG. 4 is a schematic flowchart of a communication method according to an embodiment of this application.

As shown in FIG. 4, this application provides a communication method. In the communication method, step S401 and step S402 may be performed by a network device, and step S403 may be performed by a terminal device. Alternatively, in the communication method, step S401 and step S402 may be performed by a terminal device, and step S403 may be performed by a network device. In a procedure shown in FIG. 4, an example in which step S401 and step S402 are performed by the network device and step S403 is performed by the terminal device is used for description.

It may be understood that in this embodiment of this application, a function of the network device may also be implemented by using another device or module. For example, the function of the network device may be implemented by using a chip used in the network device. A function of the terminal device may also be implemented by using another device or module. For example, the function of the terminal device may be implemented by using a chip used in the terminal device.

The procedure shown in FIG. 4 may be specifically as follows: Step S401: The network device determines a spreading block based on a first spreading factor M. M is determined based on available resource elements RE in a time-frequency resource block. The time-frequency resource block may be specifically a resource block corresponding to a second spreading factor N, the time-frequency resource block may be specifically a mapping unit corresponding to a second spreading factor N, or the like. Both M and N are integers, and M is less than N.

In this embodiment of this application, a process of determining the first spreading factor M based on a quantity of the available resource elements REs in the time-frequency resource block may be as follows: The network device sets the first spreading factor M to be equal to the quantity of the available resource elements REs in the time-frequency resource block. The available REs may be REs that can be used to map data in the spreading block.

In an example of this application, an example in which the quantity of the available resource elements in the time-frequency resource block is M is used to describe in detail a process in which the network device determines the first spreading factor M.

The network device determines the second spreading factor N and the quantity M of the available resource elements in the time-frequency resource block. When N is less than or equal to M, the network device adjusts a spreading factor from the second spreading factor N to the first spreading factor M; otherwise, the network device does not perform any operation. Alternatively, when a ratio of M to N is greater than or equal to a first threshold, a spreading factor is adjusted from the second spreading factor N to the first spreading factor M; otherwise, no operation is performed.

It should be noted that in this embodiment of this application, that N is less than M and that the ratio of M to N is greater than or equal to the first threshold are merely used as examples for adjusting the spreading factor by the network device, and are not used as a limitation on adjusting the spreading factor by the network device. For example, in this embodiment of this application, alternatively, the network device may adjust the spreading factor when the quantity of all the available resource elements REs in the time-frequency resource block cannot be exactly divided by the second spreading factor N.

In this embodiment of this application, the second spreading factor N may be preconfigured by the network device. For example, the network device may configure the second spreading factor for the terminal device by using radio resource control (RRC) signaling or downlink control information (DCI). Correspondingly, the terminal device may determine the second spreading factor based on configuration information of the network device. Specifically, in this embodiment of this application, the network device may send the configuration information, and the configuration information may be used to configure the second spreading factor N. The terminal device may receive the configuration information, and determine the second spreading factor N based on the configuration information. Specifically, the configuration information sent by the network device may be carried in broadcast information, system information, RRC signaling, a media access control (MAC) control element (CE), or DCI.

Step S402: The network device sends the spreading block, where the spreading block is mapped to the available REs in the time-frequency resource block.

Alternatively, that the network device sends the spreading block may also be referred to as that the network device maps the spreading block to the available REs in the time-frequency resource block for sending.

Step S403: The terminal device receives the spreading block, where the spreading block is mapped to the available resource elements REs in the time-frequency resource block, the spreading factor of the spreading block is the first spreading factor M, M is determined based on the available REs in the time-frequency resource block, the time-frequency resource block is the resource block corresponding to the second spreading factor N, M and N are integers, and M is less than N.

Specifically, that the terminal device receives the spreading block may also be referred to as that the terminal device receives the spreading block on the available resource elements REs in the time-frequency resource block.

In this embodiment of this application, the method provided in FIG. 4 is described in detail with reference to the application scenario shown in FIG. 1. Details are as follows:

The transmit end may perform data grouping on the input data, to obtain the one or more groups of data. The following operations may be performed on any one of the one or more groups of data. For ease of description, any group of data may be referred to as target group data. The transmit end determines the second spreading factor N and the quantity M of the available resource elements in the time-frequency resource block. If M is less than N, or the ratio of M to N is greater than or equal to the first threshold, the spreading factor is adjusted to the first spreading factor M. The transmit end may perform spreading and modulation on the target group data by using a multiple access signature corresponding to the first spreading factor M, to obtain a target spreading block. The transmit end may map the target spreading block to the available resource elements in the time-frequency resource block for sending. For example, as shown in FIG. 3, after spreading and modulation are performed on the target group data, a second spreading block may be obtained. The second spreading block may be mapped to available resource elements RE 4, RE 6, and RE 7.

It can be learned that, in the solution provided in FIG. 4, before modulation and spreading are performed on a group of data, it may be determined whether to adjust the spreading factor. If the spreading factor needs to be adjusted, spreading and modulation are performed on the data based on the adjusted spreading factor M; otherwise, spreading and modulation are performed on the data based on the original spreading factor N.

In this embodiment of this application, the second spreading factor is set to N, and the time-frequency resource block corresponding to the second spreading factor N includes the M available resource elements REs. If N is less than or equal to M, the solution recorded in FIG. 4 may be performed. Alternatively, the following solution may be executed: It is determined that the time-frequency resource block corresponding to the second spreading factor is not used for time-frequency resource mapping. In other words, the time-frequency resource block corresponding to the second spreading factor N is not used to perform uplink/downlink data transmission. This solution can be used to reduce interference to another multiplexing user.

Figure 5:
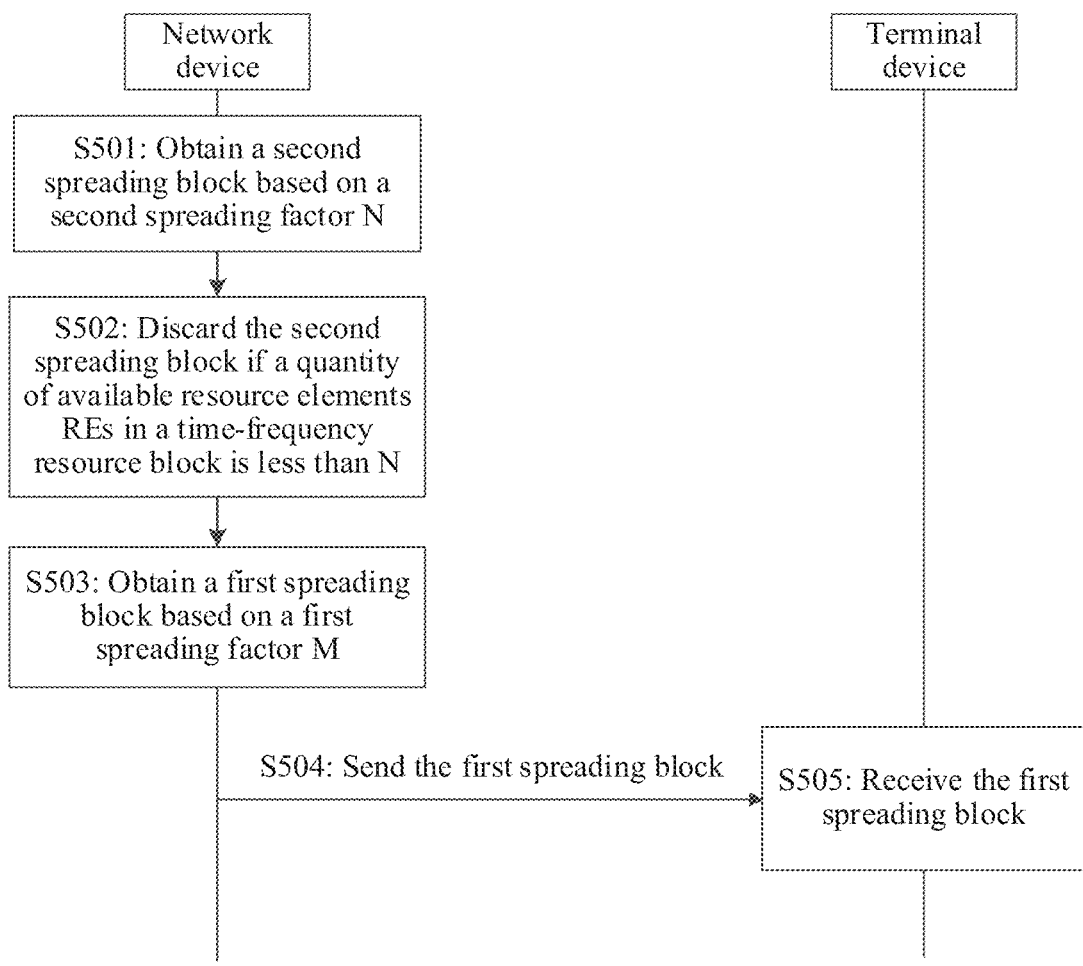
FIG. 5 is another schematic flowchart of a communication method according to an embodiment of this application.

As shown in FIG. 5, this application further provides a communication method. In the communication method, step S501 to step S504 may be performed by a network device, and step S505 may be performed by a terminal device. Alternatively, in the communication method, step S501 to step S504 may be performed by a terminal device, and step S505 may be performed by a network device. In a procedure shown in FIG. 5, an example in which step S501 to step S504 are performed by the network device and step S505 may be performed by the terminal device is used for description. The procedure may be specifically as follows:

Step S501: The network device obtains a second spreading block based on a second spreading factor N.

In this embodiment of this application, the second spreading factor N is preconfigured, or is configured by the network device for the terminal device by using signaling. For example, the network device may send configuration information, where the configuration information is used to configure the second spreading factor N. The terminal device may receive the configuration information, and determine the second spreading factor N based on the configuration information.

In this embodiment of this application, the signaling may include semi-static signaling and dynamic signaling. The semi-static signaling may be RRC signaling, a broadcast message, a system message, or a MAC CE. The broadcast message may include remaining minimum system information (RMSI). In this embodiment of this application, the dynamic signaling may be physical layer signaling. The physical layer signaling may be signaling carried on a physical control channel or signaling carried on a physical data channel. The physical control channel may be a physical downlink control channel (PDCCH), an enhanced physical downlink control channel (EPDCCH), a narrowband physical downlink control channel (NPDCCH), or a machine type communication physical downlink control channel (MPDCCH). The signaling carried on the PDCCH or the EPDCCH may also be referred to as downlink control information (DCI). The physical control channel may alternatively be a physical sidelink control channel, and signaling carried on the physical sidelink control channel may also be referred to as sidelink control information (SCI).

Step S502: If a quantity of available resource elements REs in a time-frequency resource block is less than N, the network device discards the second spreading block, where the time-frequency resource block is a resource block corresponding to the second spreading factor N.

Alternatively, "discards the second spreading block" in step S502 may alternatively be described as: not sending the second spreading block.

Alternatively, an implementation process of step S502 may alternatively be as follows: A quantity of available resource elements in a time-frequency resource block is set to M, and if a ratio of M to N is less than or equal to a first threshold, the network device discards the second spreading block.

Step S503: The network device obtains a first spreading block based on a first spreading factor M, where M is determined based on the available REs in the time-frequency resource block, M and N are integers, and M is less than N.

In this embodiment of this application, an implementation process of step S502 and step S503 may be specifically as follows: The time-frequency resource block corresponding to the second spreading factor N is determined. The quantity M of the available REs in the time-frequency resource block is determined. When M is less than or equal to N, or when the ratio of M to N is less than or equal to the first threshold, the second spreading block may be discarded or the second spreading block may not be sent, and the first spreading factor M is determined based on the quantity of the available REs in the time-frequency resource block. The first spreading block is obtained by using the first spreading factor M.

Step S504: The network device sends the first spreading block, where the first spreading block is mapped to the available REs in the time-frequency resource block.

In this embodiment of this application, that the network device sends the first spreading block may also be referred to as that the network device sends the first spreading block on the available REs in the time-frequency resource block.

Step S505: The terminal device receives the first spreading block.

In this embodiment of this application, that the terminal device receives the first spreading block may also be referred to as that the terminal device receives the first spreading block on the available REs in the time-frequency resource block. A spreading factor of the first spreading block is the second spreading factor M, where M is determined based on the available REs in the time-frequency resource block, and the time-frequency resource may be specifically a spreading block corresponding to the second spreading factor N.

In this embodiment of this application, the method provided in FIG. 5 is described in detail with reference to the application scenario shown in FIG. 1. Details are as follows:

The transmit end may perform data grouping on the input data, to obtain the one or more groups of data. The following operations may be performed on any one of the one or more groups of data. For ease of description, any group of data may be referred to as target group data. Modulation and spreading are performed on the target group data by using a multiple access signature corresponding to the second spreading factor N, to obtain the second spreading block. Before time-frequency resource mapping is performed on a target spreading block, the following operation is performed. The second spreading factor N and the quantity M of the available resource elements in the time-frequency resource block are determined. When M is less than or equal to N, or the ratio of M to N is greater than or equal to the first threshold, the second spreading block is discarded, and the first spreading factor is determined based on the available resource elements in the time-frequency resource block. Specifically, in this embodiment of this application, when M is less than or equal to N, or the ratio of M to N is greater than or equal to the first threshold, the spreading factor may be adjusted from the second spreading factor N to the first spreading factor M. Spreading and modulation are performed on the target group data by using a multiple access signature corresponding to the first spreading factor M, to obtain the first spreading block, and the first spreading block is mapped to the available resource elements in the time-frequency resource block for sending.

It can be learned that, in the solution provided in FIG. 5, before time-frequency resource mapping is performed on a group of data, it may be determined whether a current spreading block can be completely mapped. If the current spreading block cannot be completely mapped, the spreading block is discarded, and the spreading factor is adjusted. Then, spreading and modulation are performed on the data again by using the adjusted spreading factor. If the current spreading block can be completely mapped, the spreading block is sent. A process of determining whether the spreading block can be completely mapped may be as follows: Time frequency resource mapping is performed on each spreading block based on the second spreading factor N, and in a process of performing time frequency resource mapping, if there is an unavailable resource element RE in N resource elements REs corresponding to the spreading block, the network device may consider that the spreading block cannot be completely mapped; otherwise, the network device considers that the spreading block can be completely mapped.

In this embodiment of this application, the second spreading factor is set to N, and the time-frequency resource block corresponding to the second spreading factor N includes the M available resource elements. If N is less than or equal to M, the solution recorded in FIG. 5 may be performed. Alternatively, the following solution may be performed. The second spreading block is discarded, where the second spreading block is generated based on the second spreading factor N. This solution can be used to save unnecessary emission energy, and interference to another multiplexing user may be reduced.

An embodiment of this application further provides a communication method. The communication method may be performed by a network device or a terminal device. This is not limited in this embodiment of this application. The communication method may be: determining a time-frequency resource block corresponding to a second spreading factor N; and determining a quantity M of available REs in the time-frequency resource block.

In an example, if a ratio of M to N is greater than or equal to a first threshold, the solution recorded in the procedure in FIG. 4 is used; otherwise, it is determined that the time-frequency resource block corresponding to the second spreading factor is no longer used for time-frequency resource mapping.

In an example, if a ratio of M to N is greater than or equal to a first threshold, the solution recorded in the procedure in FIG. 5 is used; otherwise, a second spreading block is discarded, where the second spreading block is determined based on the second spreading factor N.

In an example, if a ratio of M to N is greater than or equal to a first threshold, the solution recorded in FIG. 2c is used; otherwise, a second spreading block is discarded. In the solution recorded in FIG. 2c, when there is an unavailable RE in a time-frequency resource block corresponding to a spreading factor, a value of the spreading factor is also adjusted. Different from the embodiment recorded in FIG. 4 or FIG. 5, in the solution recorded in FIG. 2c, a multiple access signature corresponding to the spreading factor that is before the adjustment is used to process data. However, in the embodiment recorded in FIG. 4 or FIG. 5, a multiple access signature corresponding to the adjusted spreading factor (namely, a first spreading factor) is used to process data. Processing the data by using the multiple access signature corresponding to the adjusted spreading factor can optimize performance of an entire non-orthogonal multiple access system.

It should be noted that in all the embodiments of this application, a value of the first threshold is not limited. For example, the value of the first threshold may be 0.5.

The technical solution, provided in the embodiments of this application, recorded in FIG. 4 or FIG. 5 may be used in, but is not limited to, the following scenario 1, scenario 2, and scenario 3. Details are as follows:

Scenario 1: A plurality of users perform multiplex transmission by using a non-orthogonal multiple access technology, and some REs of only some users cannot be used to transmit data. For example, a network device indicates that an orthogonal frequency division multiplexing (OFDM) symbol of some users needs to be used to send a sounding reference signal (SRS), a network device indicates that an RE of some users is used to send a phase tracking reference signal (PT-RS), a network device indicates that an RE of some users is used to send a demodulation reference signal (DMRS), a base station indicates that an RE of some users is used to send an uplink control signal, or a base station indicates that some OFDM symbols cannot be used to transmit uplink data.

Figure 6:
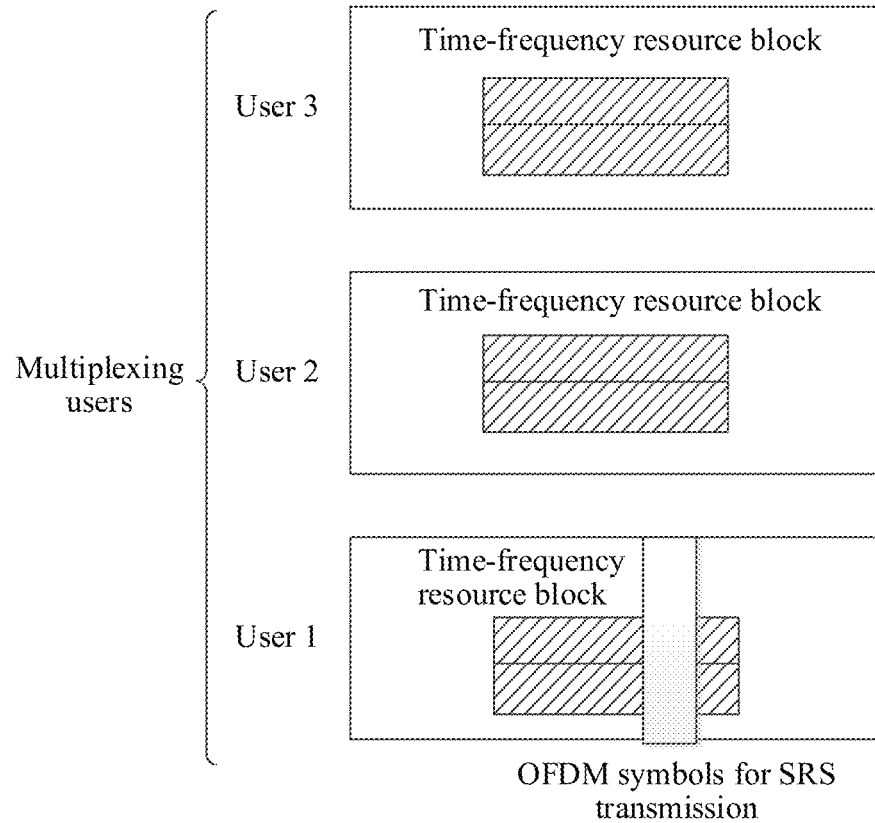
FIG. 6, FIG. 7, FIG. 8a, FIG. 8b, FIG. 8c, FIG. 8d, and FIG. 8e each are an application scenario of a communication method according to an embodiment of this application.

For example, as shown in FIG. 6, it is assumed that three users, namely, a user 1, a user 2, and a user 3, use the non-orthogonal multiple access technology to transmit uplink data on same time-frequency resource blocks, and it is assumed that some OFDM symbols of the user 1 are used for SRS transmission. Therefore, when the user 1 performs time-frequency resource mapping, if there is an RE corresponding to the unavailable OFDM symbol, the user 1 may adjust a spreading factor by using the solution recorded in FIG. 4 or FIG. 5.

For example, for the foregoing three users, a preset spreading factor is 4. If when the user 1 performs time-frequency resource mapping, there is the RE corresponding to the unavailable OFDM symbol, and a quantity of unavailable REs is 1, a quantity of available REs corresponding to the spreading factor 4 is 3. Therefore, the user 1 may modulate the spreading factor to 3, and process data by using a multiple access signature corresponding to the spreading factor of 3. The user 2 and the user 3 may continue to process data by using a multiple access signature corresponding to the spreading factor of 4.

Scenario 2: A terminal device performs repeat transmission in a repeated subframe by using a non-orthogonal multiple access technology, and subframes for two times of transmission use same time-frequency resources. Some OFDM symbols in the subframe for repeat transmission cannot be used for uplink data transmission relative to a subframe for initial transmission. In this case, the terminal device may automatically adjust a spreading factor of the subframe for repeat transmission by using the solution recorded in FIG. 4 or FIG. 5.

Figure 7:
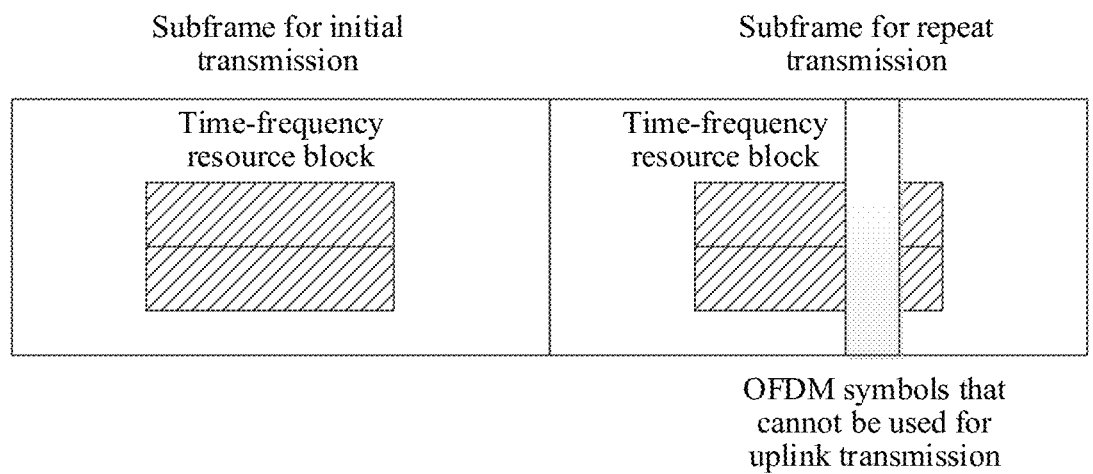

As shown in FIG. 7, for example, a subframe used for initial transmission and a subframe used for repeat transmission use same time-frequency resources, and a configured spreading factor SF is 4. In a time-frequency resource of the subframe used for repeat transmission, some OFDM symbols cannot be used for uplink data transmission. During transmission in the subframe used for initial transmission, the terminal device may process data by using a multiple access signature corresponding to the SF, namely, 4. During transmission in the subframe used for repeat transmission, if when the terminal device performs time-frequency resource mapping, there is an RE corresponding to the unavailable OFDM symbol, and a quantity of unavailable REs is set to 1, to be specific, a quantity of available REs in a time-frequency resource block corresponding to the spreading factor SF, namely, 4, is 3, the terminal device may process data by using a multiple access signature corresponding to an SF, namely, 3.

Figure 8A:
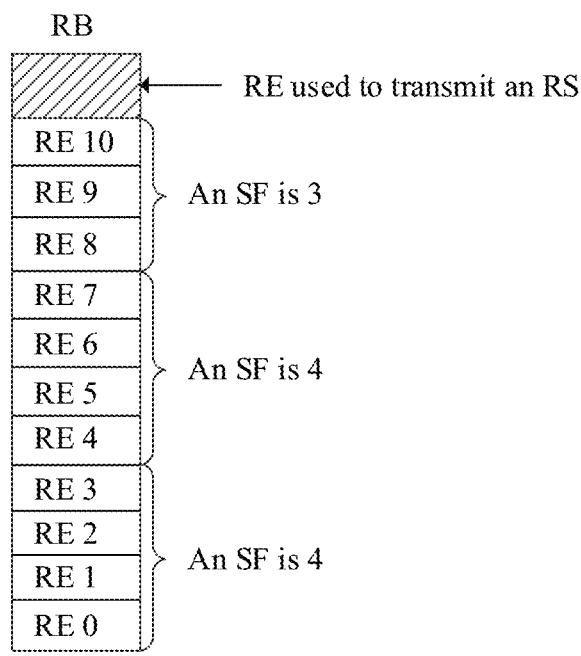

Scenario 3: As shown in FIG. 8a, a user performs data transmission by using a non-orthogonal multiple access technology, and a resource block (RB) is allocated for data transmission. Spreading factor SF=4, and a resource mapping manner is frequency-domain-first. An RE in the RB is pre-allocated to send a reference signal (RS) (for example, a PT-RS signal). One RB may include 12 REs, and one RE is pre-allocated to send the RS. In other words, only 11 REs in the RB may be used for data transmission. Numbers of the 11 available REs are set to an RE 0 to an RE 10. Therefore, when time frequency resource mapping from the RE 0 to the RE 7 is performed, SF=4. When time frequency resource mapping from the RE 8 to the RE 10 is performed, the spreading factor is adjusted to an SF, namely, 3, and a multiple access signature corresponding to the spreading factor SF, namely, 3, is used to perform processing such as modulation and spreading on data.

Scenario 4: When time-frequency resource mapping is performed, if a quantity of available REs in time domain or frequency domain cannot be exactly divided by a spreading factor SF, the solution recorded in FIG. 4 or FIG. 5 may be used to adjust the spreading factor. A time-frequency resource mapping manner may be frequency-domain-first, or may be time-domain-first.

Figure 8B:
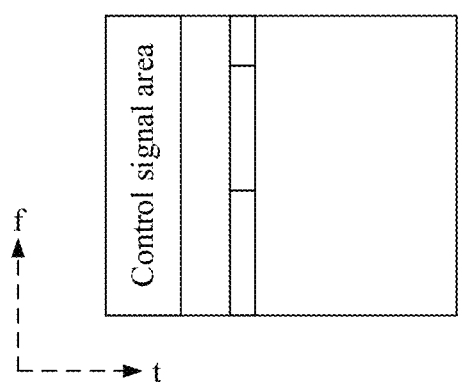

Example 1: As shown in FIG. 8b, it is assumed that one RB is allocated for non-orthogonal multiple access transmission, and a mapping manner is frequency-domain-first. A quantity of available REs in frequency domain is 12, and spreading factor SF=5. In this case, the quantity of available REs in frequency domain cannot be exactly divided by the SF.

Figure 8C:
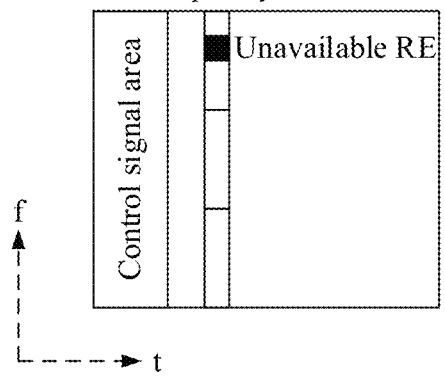

Example 2: As shown in FIG. 8c, it is assumed that one RB is allocated for non-orthogonal multiple access transmission, and a mapping manner is frequency-domain-first. There is one unavailable RE in the RB. A quantity of available REs in frequency domain is 11, and spreading factor SF=4. In this case, the quantity of available REs in frequency domain cannot be exactly divided by the SF.

Figure 8D:
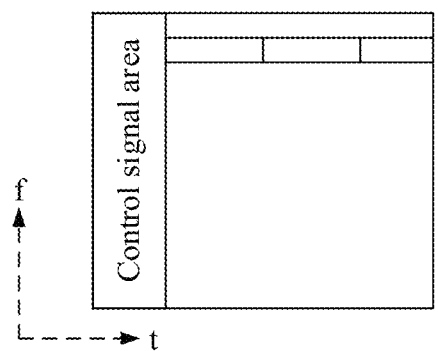

Example 3: As shown in FIG. 8d, it is assumed that 11 OFDM symbols are allocated for non-orthogonal multiple access transmission, and a mapping manner is time-domain-first. A quantity of available REs in time domain is 11, and spreading factor SF=4. In this case, the quantity of available REs in time domain cannot be exactly divided by the SF.

Figure 8E:
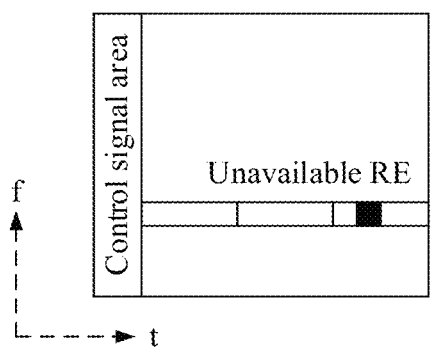

Example 4: As shown in FIG. 8e, it is assumed that 12 OFDM symbols are allocated for non-orthogonal multiple access transmission, and a mapping manner is time-domain-first. If there is an unavailable RE, quantity of available REs in time domain=11, and SF=4. In this case, the quantity of available REs in time domain cannot be exactly divided by the SF.

Scenario 5: In a transmission process, a quantity of all available REs cannot be exactly divided by a spreading factor SF. In this case, complete resource mapping cannot be performed on the last spreading block, and the spreading factor may be adjusted by using the solution recorded in FIG. 4 or FIG. 5.

For example, in one transmission process, two RBs are allocated to the terminal device for uplink data transmission, and the two RBs include 24 REs in total. SF=5. In this case, a quantity of available REs in one transmission process cannot be exactly divided by the spreading factor.

Figure 9:
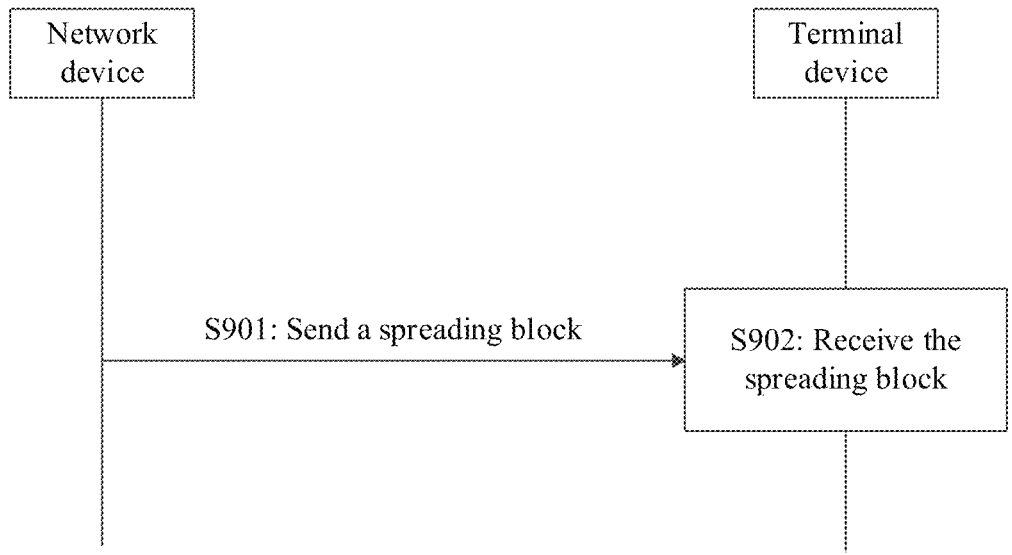
FIG. 9 is still another schematic flowchart of a communication method according to an embodiment of this application.

In the embodiments of this application, a mapping manner may be changed by adjusting a spreading factor, to reduce multi-user interference, save transmit energy, improve resource utilization, and finally improve performance of a non-orthogonal multiple access system. As shown in FIG. 9, this application further provides a communication method. In the communication method, step S901 may be performed by a network device, and step S902 may be performed by a terminal device. Alternatively, in the communication method, step S901 may be performed by a terminal device, and step S902 may be performed by a network device. In a procedure shown in FIG. 9, an example in which step S901 is performed by the network device and step S902 is performed by the terminal device is used for description. The procedure may be specifically as follows:

Step S901: The network device sends a spreading block.

Step S902: The terminal device receives the spreading block.

In this embodiment of this application, the spreading block may be mapped in a time-domain-first manner, or may be mapped in a frequency-domain-first manner. The spreading block may be mapped to resource elements REs on OFDM symbols, or may be mapped to resource elements REs on single-carrier frequency division multiple access (SC-FDMA) symbols. The resource element RE may be specifically an available resource element. The available resource element is specifically an allocated resource element used for data transmission. It should be noted that a resource element recorded in the following embodiment may be specifically an available resource element, which is not described one by one subsequently. For example, the available resource element may be the available resource element described in the foregoing embodiment. For example, the method described in FIG. 9 may be used in combination with the method described in FIG. 4 or FIG. 5.

In an example of this application, when the spreading block is mapped in the frequency-domain-first manner and is mapped to the OFDM symbols, a manner of mapping the spreading block may be specifically as follows: The spreading block may be mapped to at least an $i^{th}$ OFDM symbol and an $(i+1)^{th}$ OFDM symbol. A first complex symbol in the spreading block is mapped to a resource element RE on the $i^{th}$ OFDM symbol in a first direction in frequency domain, and a second complex symbol in the spreading block is mapped to an RE on the $(i+1)^{th}$ OFDM symbol in a second direction in frequency domain. The first direction is opposite to the second direction. i is an integer. The first complex symbol and the second complex symbol each may include one or more symbols. A quantity of the symbols included in the first complex symbol and a quantity of the symbols included in the second complex symbol may be the same, or may be different. This is not limited in this application.

Figure 10A:
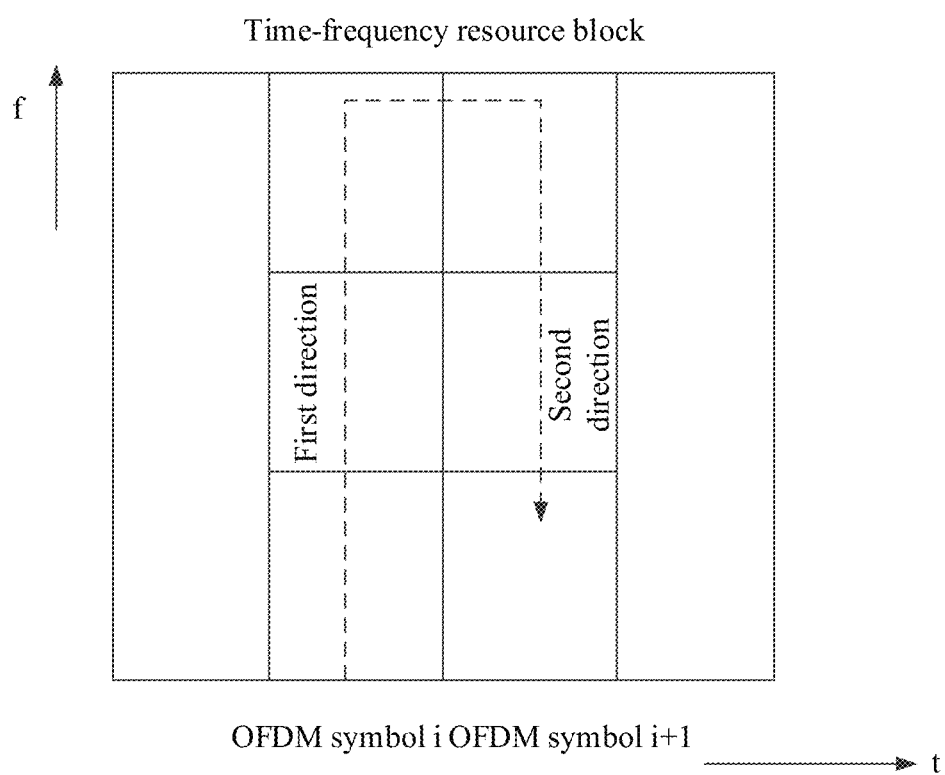
FIG. 10a and FIG. 10b are a schematic diagram of time-domain-first mapping according to an embodiment of this application.
Figure 10B:
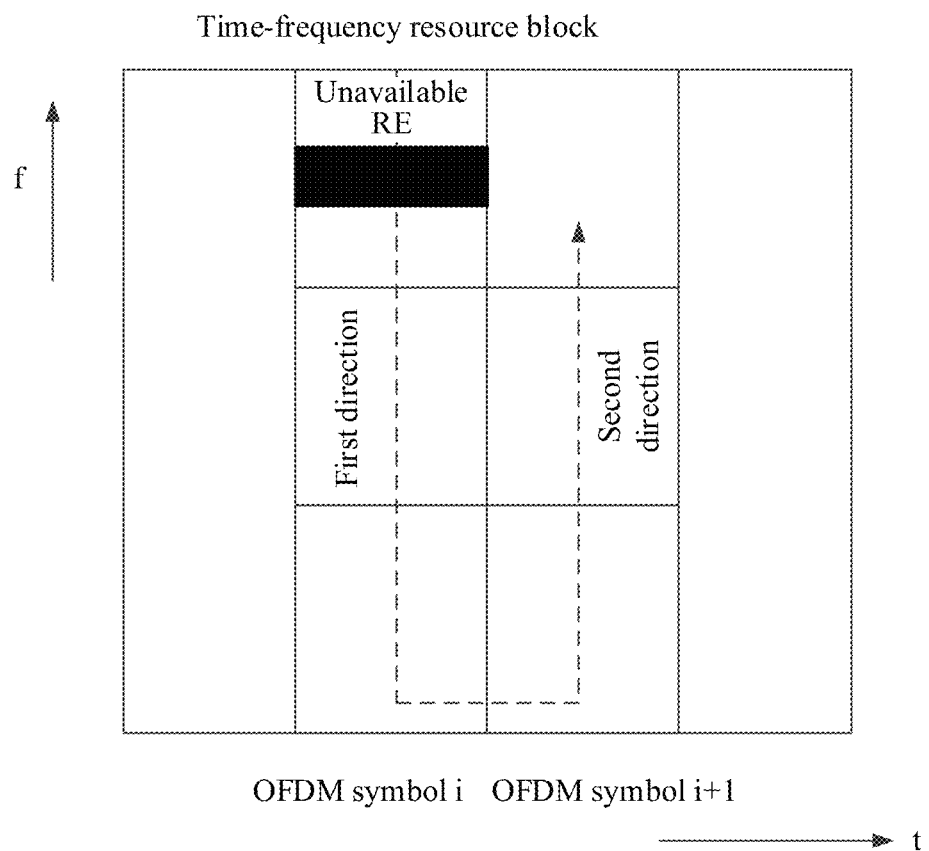

In this embodiment of this application, as shown in FIG. 10a and FIG. 10b, the first direction may be a frequency domain increasing direction, and the second direction may be a frequency domain decreasing direction.

Figure 11A:
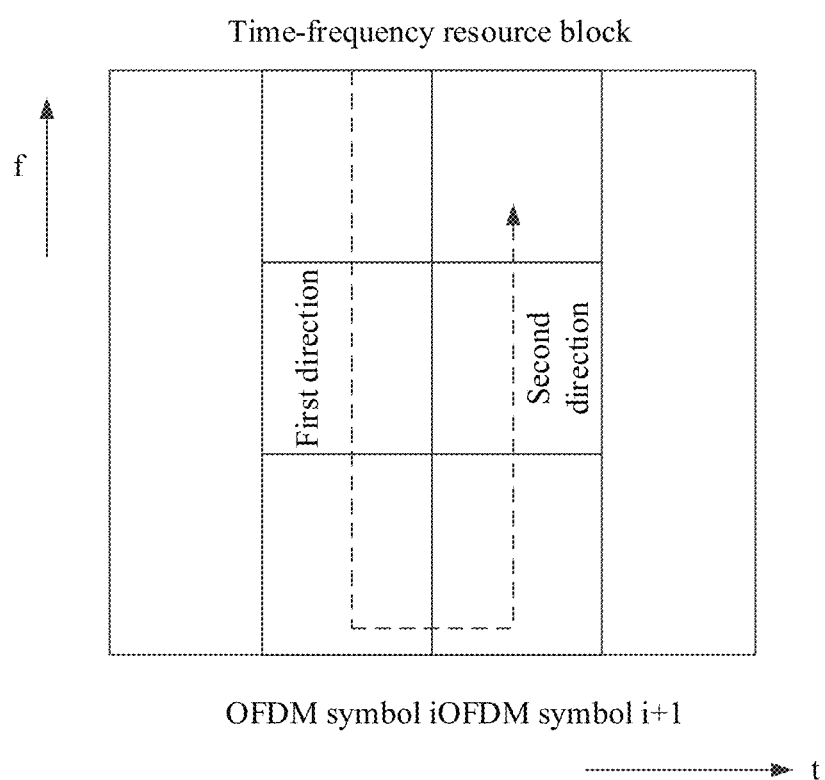
FIG. 11a and FIG. 11b are another schematic diagram of time-domain-first mapping according to an embodiment of this application.
Figure 11B:
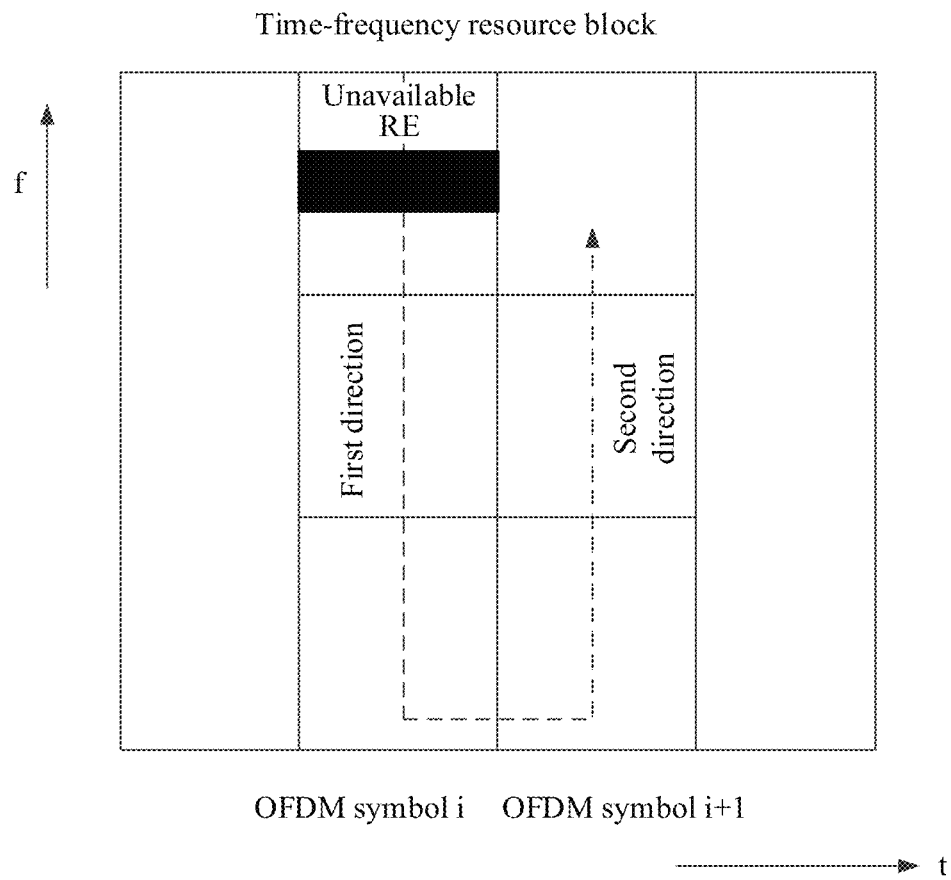

Alternatively, as shown in FIG. 11a and FIG. 11b, the first direction is a frequency domain decreasing direction, and the second direction is a frequency domain increasing direction.

In another example of this application, when the spreading block is mapped in the time-domain-first manner, a manner of mapping the spreading block may be specifically as follows: The spreading block is mapped to at least an $i^{th}$ subcarrier and an $(i+1)^{th}$ subcarrier. A third complex symbol in the spreading block is mapped to an RE on the $i^{th}$ subcarrier in a third direction in time domain, and a fourth complex symbol in the spreading block is mapped to an RE on the $(i+1)^{th}$ subcarrier in a fourth direction in time domain. The third direction is opposite to the fourth direction. i is a positive integer. The third complex symbol and the fourth complex symbol each may include one or more symbols. A quantity of the symbols included in the third complex symbol and a quantity of the symbols included in the fourth complex symbol may be the same, or may be different. This is not limited in this application.

Figure 12A:
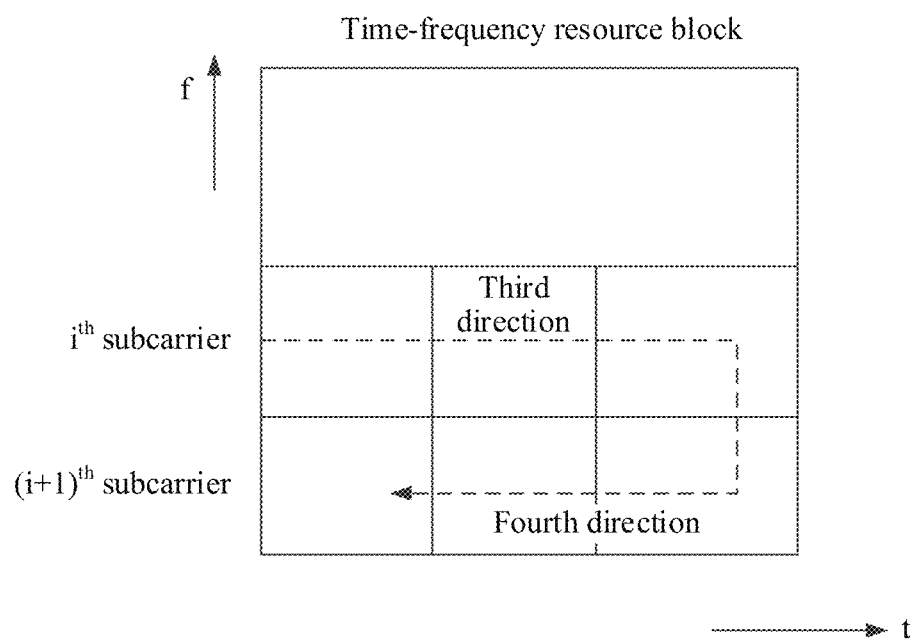
FIG. 12a and FIG. 12b are a schematic diagram of frequency-domain-first mapping according to an embodiment of this application.
Figure 12B:
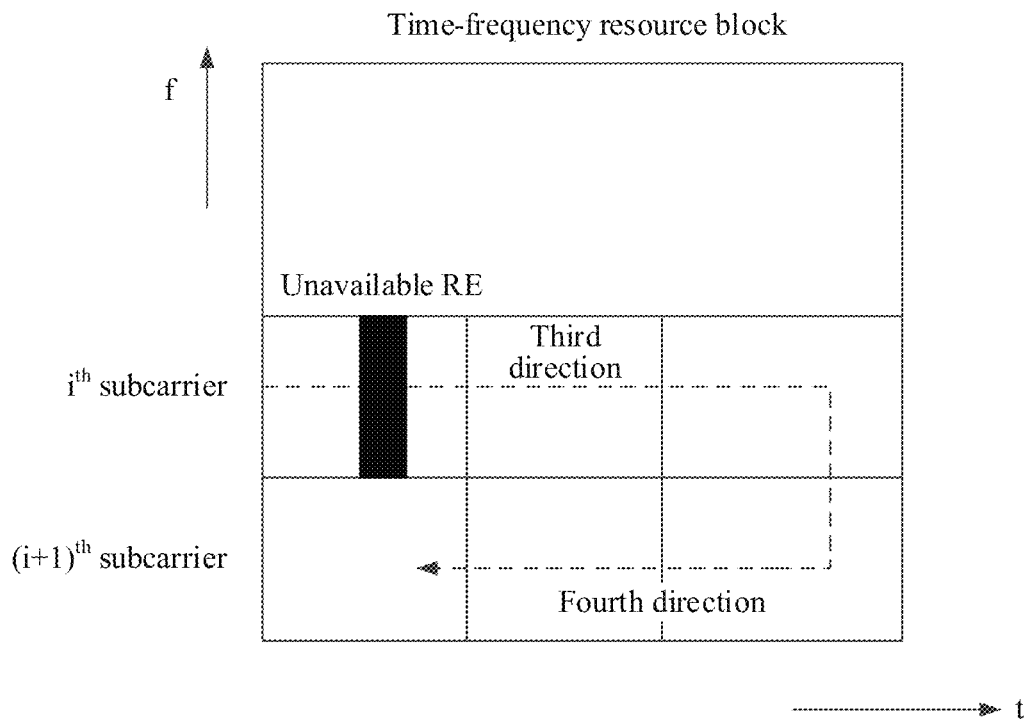
Figure 13A:
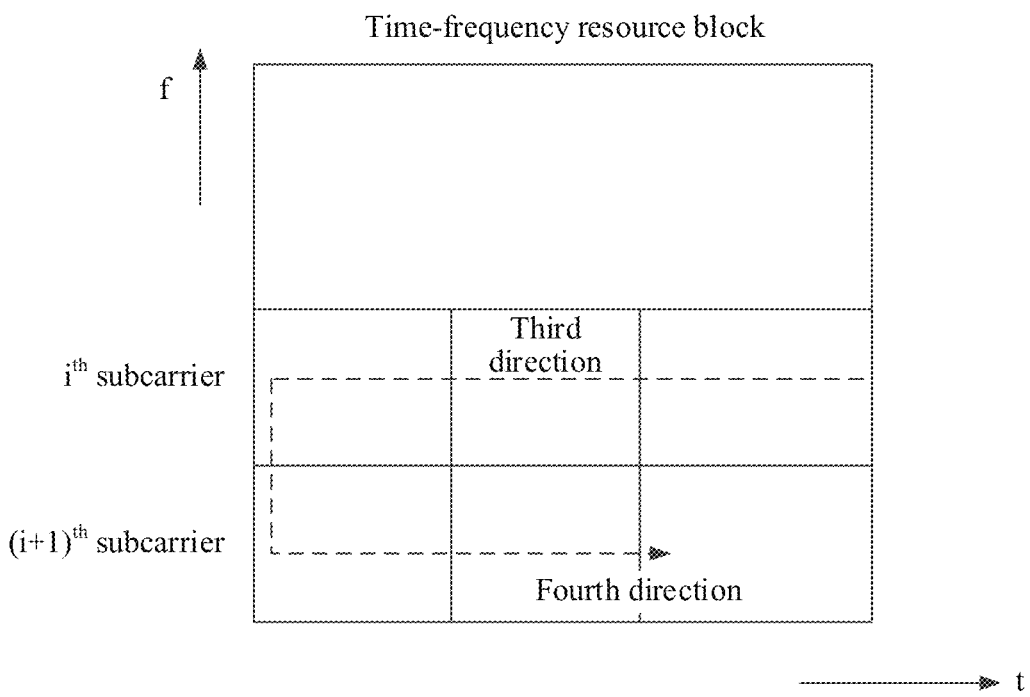
FIG. 13a and FIG. 13b are another schematic diagram of frequency-domain-first mapping according to an embodiment of this application.

In this embodiment of this application, as shown in FIG. 12a or FIG. 12b, the third direction is a time domain increasing direction, and the fourth direction is a time domain decreasing direction. Alternatively, as shown in FIG. 13a or FIG. 13b, the third direction is a time domain decreasing direction, and the fourth direction is a time domain increasing direction.

It should be noted that, in this embodiment of this application, when time-frequency resource mapping is performed, complex symbols in the spreading block may be specifically mapped to available REs in a time-frequency resource block. If there is an unavailable RE in a mapping process, a spreading factor is adjusted, and the unavailable RE is skipped. For a manner of adjusting the spreading factor, refer to the solution recorded in FIG. 4 or FIG. 5. For details, refer to FIG. 10b, FIG. 11b, FIG. 12b, or FIG. 13b.

In this embodiment of this application, the foregoing manner can be used to ensure that complex symbols in a same spreading block are mapped to adjacent RE locations. In this way, a requirement that "complex symbols in a same spreading block are mapped to REs in adjacent locations as much as possible" in the prior art for a non-orthogonal multiple access technology is satisfied. Because channel features of the adjacent REs are similar, spreading performance of the spreading block can be ensured.

Figures 13B, 14:
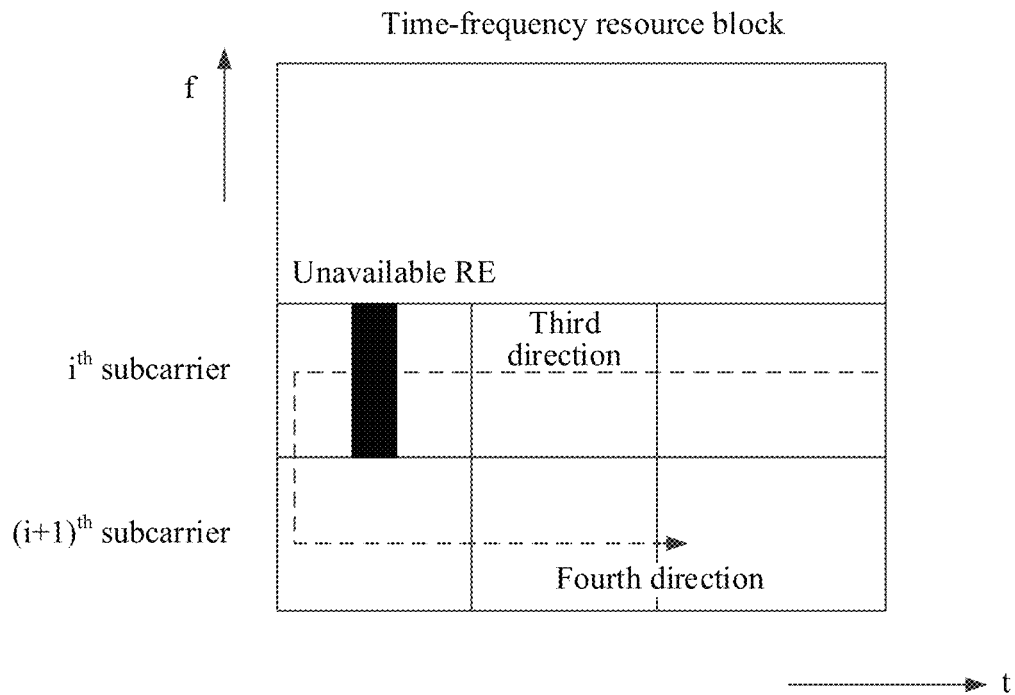
FIG. 14 and FIG. 15 each are a schematic flowchart of a data processing method according to an embodiment of this application.

As shown in FIG. 14, this application further provides a data processing method. The method may be performed by a network device, or may be performed by a terminal device. In a procedure shown in FIG. 14, an example in which the method is performed by the terminal device is used for description. The procedure may be specifically as follows:

Step S141: The terminal device determines a spreading block based on a first spreading factor M.

M is determined based on available resource elements REs in a time-frequency resource block. The time-frequency resource block is a resource block corresponding to a second spreading factor N. M and N are integers. M is less than N.

Step S142: When a ratio of M to N is less than a first threshold, the terminal device discards the spreading block.

Optionally, step S142 may be replaced with the following manner: When M is less than N, the terminal device discards the spreading block.

In this embodiment of this application, for a process in which the terminal device determines the spreading block based on the first spreading factor, refer to the foregoing description in FIG. 4 or FIG. 5. Details are not described herein again.

Figure 15:
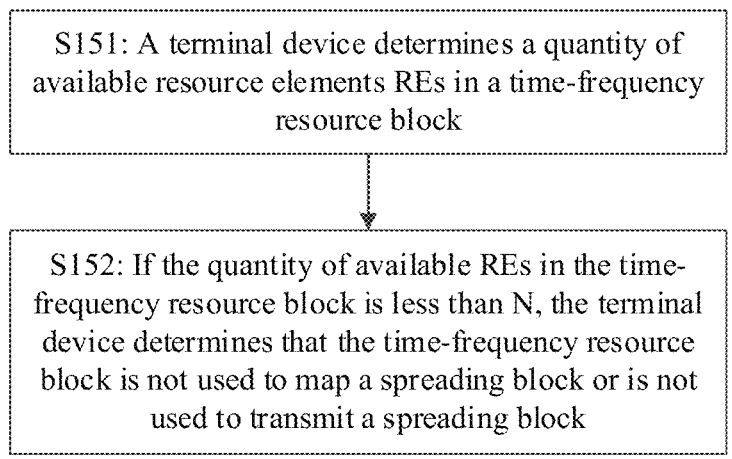

As shown in FIG. 15, this application further provides a data processing method. The method may be performed by a network device, or may be performed by a terminal device. In a procedure shown in FIG. 15, an example in which the method is performed by the terminal device is used for description. The procedure may be specifically as follows:

Step S151: A terminal device determines a quantity of available resource elements REs in a time-frequency resource block, where the time-frequency resource block is a resource block corresponding to a spreading factor N.

Step S152: If the quantity of available REs in the time-frequency resource block is less than N, the terminal device determines that the time-frequency resource block is not used to map a spreading block or is not used to transmit a spreading block, where transmitting the spreading block may be sending the spreading block, or may be receiving the spreading block.

Optionally, step S152 may be replaced with the following manner: When a ratio of M to N is less than a first threshold, the terminal device determines that the time-frequency resource is not used to map a spreading block or is not used to transmit a spreading block.

For description of a specific embodiment in FIG. 15, refer to the description of the procedure shown in FIG. 4 or FIG. 5. Details are not described herein again.

In the foregoing recorded embodiments, the methods provided in the embodiments of this application are described. To implement functions in the methods provided in the embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on a specific application and a design constraint of the technical solutions.

Figure 16:
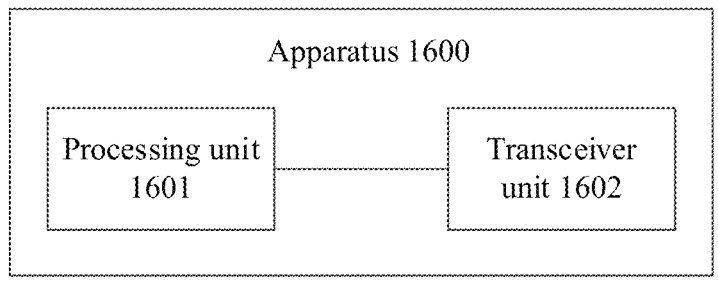
FIG. 16 is a schematic structural diagram of an apparatus according to an embodiment of this application.

Same as the foregoing concept, as shown in FIG. 16, this application further provides an apparatus 1600. The apparatus 1600 may include a processing unit 1601 and a transceiver unit 1602.

In a possible implementation, the apparatus 1600 may be a network device, or may be an apparatus that can support a network device in implementing a function of the network device in the method in FIG. 4, FIG. 5, or FIG. 9. For example, the apparatus may be an apparatus (for example, a chip or a chip system) in a network device. It should be noted that in this embodiment of this application, the chip system may include a chip, or may include a chip and another discrete component.

Example 1: The processing unit 1601 may determine a spreading block based on a first spreading factor M, where M is determined based on available resource elements REs in a time-frequency resource block, the time-frequency resource block is a resource block corresponding to a second spreading factor N, M and N are integers, and M is less than N. The transceiver unit 1602 may send the spreading block, and the spreading block is mapped to the available REs in the time-frequency resource block.

Example 2: The processing unit 1601 may obtain a second spreading block based on a second spreading factor N, discard the second spreading block if a quantity of available resource elements REs in a time-frequency resource block is less than N, and obtain a first spreading block based on a first spreading factor M, where the time-frequency resource block is a resource block corresponding to the second spreading factor N, M is determined based on the available REs in the time-frequency resource block, M and N are integers, and M is less than N. The transceiver unit 1602 may send the first spreading block, and the first spreading block is mapped to the available REs in the time-frequency resource block.

Example 3: The processing unit 1601 may generate a spreading block. The transceiver unit 1602 may send the spreading block, where the spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer.

In a possible implementation, the apparatus 1600 may be a terminal device, or may be an apparatus that can support a terminal device in implementing a function of the terminal device in the method in FIG. 4, FIG. 5, FIG. 9, FIG. 14, or FIG. 15. For example, the apparatus may be an apparatus (for example, a chip or a chip system) in a terminal device.

Example 1: The transceiver unit 1602 may receive a spreading block, where the spreading block is mapped to available resource elements REs in a time-frequency resource block, a spreading factor of the spreading block is a first spreading factor M, M is determined based on the available REs in the time-frequency resource block, the time-frequency resource block is a resource block corresponding to a second spreading factor N, M and N are integers, and M is less than N. The processing unit 1601 may process the received spreading block, for example, perform processing such as demodulation and despreading.

Example 2: The transceiver unit 1602 may receive a first spreading block, where the first spreading block is mapped to available resource elements REs in a time-frequency resource block, a spreading factor of the first spreading block is a second spreading factor M, M is determined based on the available REs in the time-frequency resource block, the time-frequency resource block is a resource block corresponding to a second spreading factor N, M and N are integers, and M is less than N. The processing unit 1601 may process the first spreading block, for example, perform processing such as demodulation and despreading.

Example 3: The transceiver unit 1602 may receive a spreading block, where the spreading block is mapped to at least an $i^{th}$ orthogonal frequency division multiplexing OFDM symbol and an $(i+1)^{th}$ OFDM symbol, a first complex symbol in the spreading block is mapped to a resource element RE on the $i^{th}$ OFDM symbol in a first direction in frequency domain, a second complex symbol in the spreading block is mapped to an RE on the $(i+1)^{th}$ OFDM symbol in a second direction in frequency domain, and the first direction is opposite to the second direction; or the spreading block is mapped to at least an $i^{th}$ subcarrier and an $(i+1)^{th}$ subcarrier, a third complex symbol in the spreading block is mapped to an RE on the $i^{th}$ subcarrier in a third direction in time domain, a fourth complex symbol in the spreading block is mapped to an RE on the $(i+1)^{th}$ subcarrier in a fourth direction in time domain, the third direction is opposite to the fourth direction, and i is a positive integer. The processing unit 1601 may process, for example, demodulate and despread, the spreading block.

Figure 17:
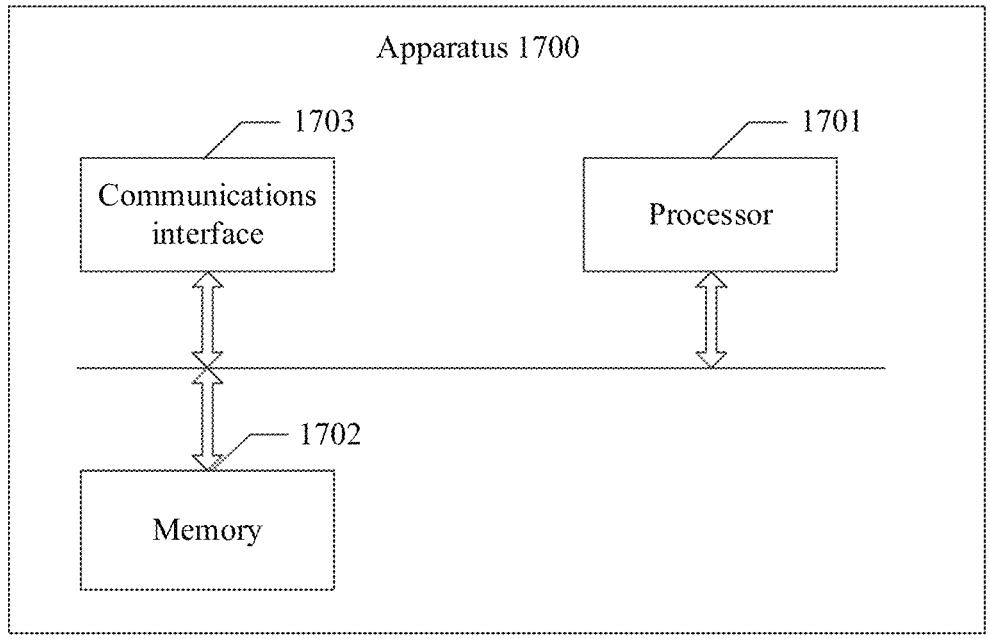
FIG. 17 is another schematic structural diagram of an apparatus according to an embodiment of this application.

Based on the same concept, as shown in FIG. 17, this application further provides an apparatus 1700. The apparatus 1700 may be a network device, or may be an apparatus that can support a network device in implementing a function of the network device in FIG. 4, FIG. 5, or FIG. 9. For example, the apparatus 1700 may be an apparatus (for example, a chip or a chip system) in a network device. Alternatively, the apparatus 1700 may be a terminal device, or may be an apparatus that can support a terminal device in implementing a function of the terminal device in FIG. 4, FIG. 5, or FIG. 9. For example, the apparatus 1700 may be an apparatus (for example, a chip or a chip system) in a terminal device.

The apparatus 1700 may include at least one processor 1701, configured to implement a function of the communication method provided in FIG. 4, FIG. 5, or FIG. 9.

The apparatus 1700 may further include at least one memory 1702, configured to store a program instruction and/or data. The memory 1702 is coupled to the processor 1701. A coupling in this embodiment of this application is an indirect coupling or a communication connection between apparatuses, units, or modules, may be in an electrical form, a mechanical form, or another form, and is used for information exchange between the apparatuses, the units, or the modules. The processor 1701 may operate with the memory 1702. The processor 1701 may execute the program instruction stored in the memory 1702. The at least one memory 1702 may be included in the processor 1701.

The apparatus 1700 may further include a communications interface 1703, and the apparatus 1700 may exchange information with another device through the communications interface 1703. The communications interface 1703 may be a circuit, a bus, a transceiver, or any other apparatus that may be configured to exchange information. For example, the another device may be another terminal device or another network device. The processor 1701 may send and receive data by using the communications interface 1703. For example, the communications interface 1703 is configured to send a spreading block.

In this embodiment of this application, a specific connection medium between the communications interface 1703, the processor 1701, and the memory 1702 is not limited. In this embodiment of this application, the memory 1702, the processor 1701, and the communications interface 1703 are connected through a bus in FIG. 17, and the bus is represented by a thick line in FIG. 17. A manner of a connection between other components is merely schematically described, and is not limited thereto. The bus may be classified into an address bus, a data bus, a control bus, and the like. For ease of representation, only one thick line is used to represent the bus in FIG. 17, but this does not mean that there is only one bus or only one type of bus.

In this embodiment of this application, the processor may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in this embodiment of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

In this embodiment of this application, a memory may be a non-volatile memory such as a hard disk drive (HDD) or a solid-state drive (SSD), or may be a volatile memory such as a random-access memory (RAM). The memory may alternatively be any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store the program instruction and/or the data.

Figure 18:
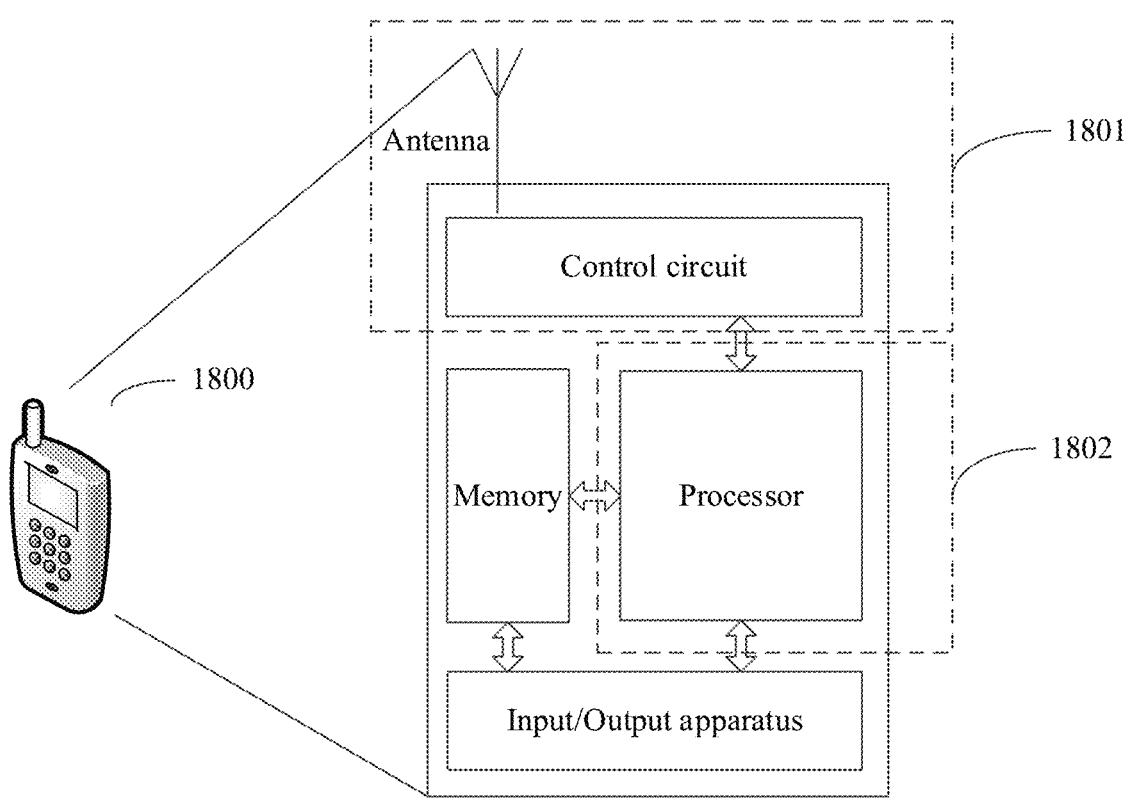
FIG. 18 is a schematic structural diagram of a terminal device according to an embodiment of this application.

FIG. 18 is a schematic structural diagram of a terminal device. The terminal device may correspond to the terminal device shown in FIG. 4, FIG. 5, FIG. 9, FIG. 14, or FIG. 15. For ease of description, FIG. 18 shows only main components of the terminal device. As shown in FIG. 18, the terminal device 1800 includes a processor, a memory, a control circuit, an antenna, and an input/output apparatus. The processor is mainly configured to: process a communications protocol and communication data, control entire user equipment, execute a software program, and process data of the software program. The memory is mainly configured to store the software program and the data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in a form of an electromagnetic wave. The input/output apparatus, such as a touchscreen, a display, or a keyboard, is mainly configured to receive data input by a user and data output to the user.

In this embodiment of this application, the processor may read the software program in a storage unit, interpret and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of an electromagnetic wave. When data is sent to the user equipment, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that, for ease of description, FIG. 18 shows only one memory and one processor. In actual user equipment, there may be a plurality of processors and a plurality of memories. The memory may also be referred to as a storage medium, a storage device, or the like. This is not limited in some embodiments of the application.

In an optional implementation, the processor may include a baseband processor and a central processing unit. The baseband processor is mainly configured to process a communications protocol and communication data. The central processing unit is mainly configured to: control the entire user equipment, execute the software program, and process the data of the software program. The processor in FIG. 18 integrates functions of the baseband processor and the central processing unit. A person skilled in the art may understand that, alternatively, the baseband processor and the central processing unit may be independent processors, and interconnected by using a technology such as a bus. A person skilled in the art may understand that the user equipment may include a plurality of baseband processors to adapt to different network standards, the user equipment may include a plurality of central processing units to enhance a processing capability of the user equipment, and components of the user equipment may be connected through various buses. The baseband processor may also be expressed as a baseband processing circuit or a baseband processing chip. The central processing unit may also be expressed as a central processing circuit or a central processing chip. A function of processing the communications protocol and the communication data may be embedded into the processor, or may be stored in the storage unit in a form of the software program. The processor executes the software program to implement a baseband processing function.

For example, in some embodiments of the application, the antenna having a transceiver function and the control circuit may be considered as a transceiver unit 1801 of the terminal device 1800, and the processor having a processing function may be considered as a processing unit 1802 of the terminal device 1800. As shown in FIG. 18, the terminal device 1800 may include the transceiver unit 1801 and the processing unit 1802. The transceiver unit may also be referred to as a transceiver, a transceiver apparatus, or the like. Optionally, a component that is in the transceiver unit 1801 and that is configured to implement a receiving function may be considered as a receiving unit, and a component that is in the transceiver unit 1801 and that is configured to implement a sending function may be considered as a sending unit. To be specific, the transceiver unit 801 includes the receiving unit and the sending unit. For example, the receiving unit may also be referred to as a receiver, a receiver, a receiving circuit, or the like, and the sending unit may be referred to as a transmitter, a transmitter, a transmitting circuit, or the like.

Figure 19:
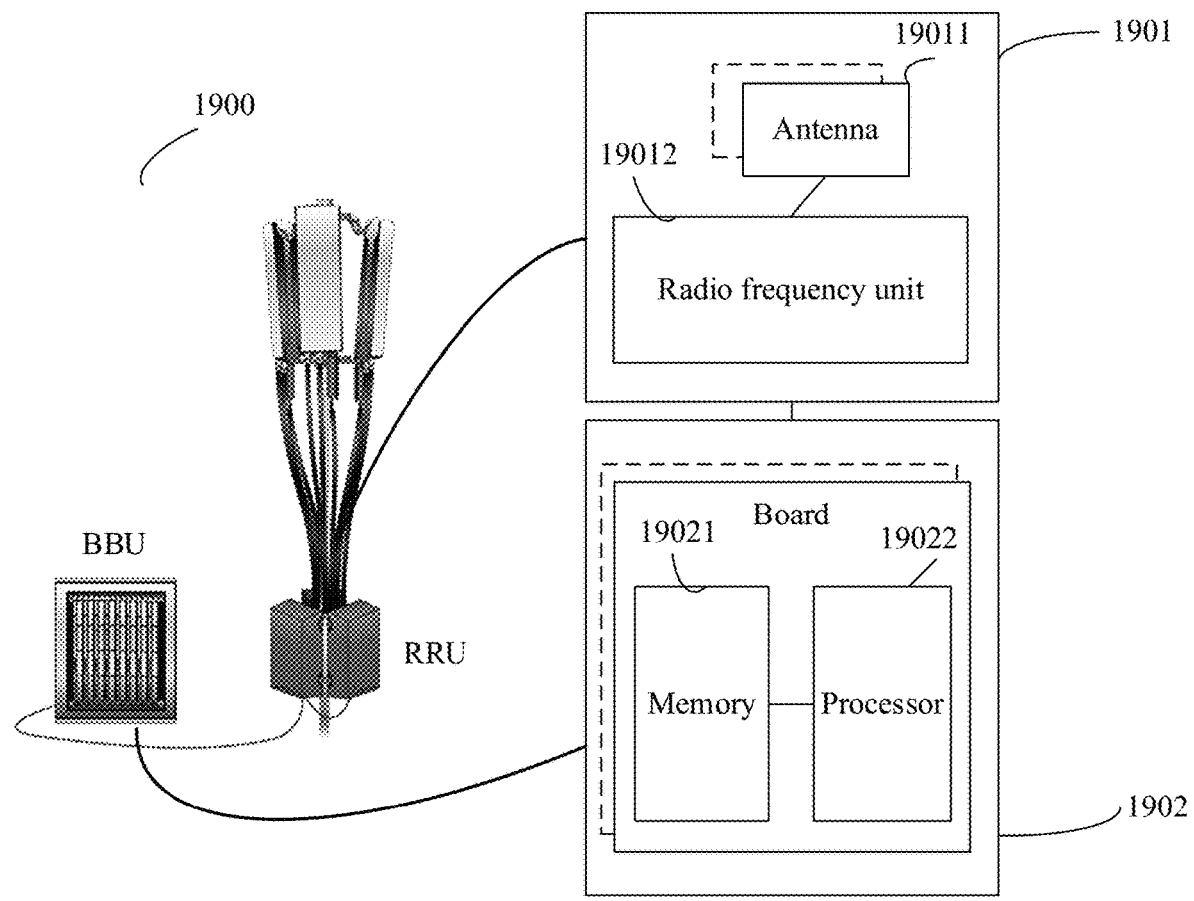
FIG. 19 is a schematic structural diagram of a network device according to an embodiment of this application.

FIG. 19 is a schematic structural diagram of a network device. For example, FIG. 19 may be a schematic structural diagram of a base station. As shown in FIG. 19, the base station may be used in the method procedure shown in FIG. 4, FIG. 5, or FIG. 9, to perform a function of the network device in the foregoing procedure. The base station 1900 may include one or more radio frequency units such as a remote radio unit (RRU) 1901 and one or more baseband units (BBU) (which may also be referred to as a digital unit, DU) 1902. The RRU 1901 may be referred to as a transceiver unit, a transceiver, a transceiver circuit, a transceiver, or the like, and may include at least one antenna 19011 and a radio frequency unit 19012. The RRU 1901 is mainly configured to: send and receive radio frequency signals and perform conversion between a radio frequency signal and a baseband signal, and for example, is configured to send the spreading block in the foregoing embodiment to a terminal. The BBU 1902 is mainly configured to perform baseband processing, control the base station, and so on. The RRU 1901 and the BBU 1902 may be physically disposed together, or may be physically disposed separately. For example, the base station is a distributed base station.

In an embodiment, the BBU 1902 may include one or more boards. A plurality of boards may jointly support a radio access network (for example, an LTE network) of a single access standard, or may separately support radio access networks (for example, an LTE network, a 5G network, or another network) of different access standards. The BBU 1902 further includes a memory 19021 and a processor 19022. The memory 19021 is configured to store a necessary instruction and necessary data. For example, the memory 19021 stores an instruction for determining the spreading block based on the first spreading factor M in the foregoing embodiment. The processor 19022 is configured to control the base station to perform a necessary action, for example, configured to control the base station to perform the operation procedure related to the network device in the foregoing method embodiment. The memory 19021 and the processor 19022 may serve one or more boards. In other words, a memory and a processor may be separately disposed on each board. Alternatively, a plurality of boards may share a same memory and a same processor. In addition, a necessary circuit may be further disposed on each board.

According to the methods provided in the embodiments of this application, some embodiments of the application further provides a communications system, including the terminal device and the network device described above.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, for example, a USB flash drive, a removable hard disk, a read-only memory, a random-access memory, a magnetic disk, or an optical disc.

Based on the foregoing embodiments, an embodiment of this application further provides a chip system. The chip system includes a processor, configured to implement a function in any one or more of the foregoing embodiments, for example, obtain or process the information or the message in the foregoing methods. Optionally, the chip system further includes a memory, and the memory is configured to store a program instruction and data that are necessary and executed by the processor. The chip system may include a chip, or may include a chip and another discrete device.

It should be understood that in some embodiments of the application, the processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory may include a read-only memory and a random-access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor, or by using instructions in a form of software. The steps of the method disclosed with reference to some embodiments of the application may be directly performed by a hardware processor, or may be performed by using a combination of hardware in the processor and a software module. The software module may be located in a mature storage medium in the art, for example, a random-access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

In the apparatus embodiments of this application, division into the modules of an apparatus is logical function division and may be other division during actual implementation. For example, function modules of the apparatus may be integrated into one module, or may be separated from each other, or at least two function modules may be integrated into one module.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to some embodiments of the application are completely or partially generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely intended to describe the technical solutions in this application, but not to limit the protection scope of this application. Modification, equivalent replacement, improvement, or the like made based on the technical solutions in this application shall fall within the protection scope of this application.

What is claimed is:

1. A communication method, comprising:
    determining, by a processing unit in communication with a transceiver unit, both of a wireless device, a first number of complex symbols in a first spreading block by setting the first number of complex symbols equal to a first plurality of available resource elements in a time-frequency resource block, and mapping the first number of complex symbols to the first plurality of available resource elements;
    determining, by the processing unit, a second number of complex symbols in a second spreading block by setting the second number of complex symbols equal to a second plurality of available resource elements in the time-frequency resource block, and mapping the second number of complex symbols to the second plurality of available resource elements, wherein the first and second numbers of complex symbols are integers, and the first number of complex symbols is less than the second number of complex symbols; and
    sending, by the transceiver unit, the first and second spreading blocks.

2. The method according to claim 1, wherein a ratio of the first number of complex symbols to the second number of complex symbols is greater than or equal to a first threshold.

3. The method according to claim 1, wherein the method further comprises:
    sending configuration information used to configure the second number of complex symbols.

4. An apparatus comprising:
    at least one processor in communication with a communications interface including a transceiver, wherein
    the at least one processor is configured to determine a first number of complex symbols in a first spreading block by setting the first number of complex symbols equal to a first plurality of available resource elements in a time-frequency resource block, and mapping the first number of complex symbols to the first plurality of available resource elements;
    the at least one processor is also configured to determine a second number of complex symbols in a second spreading block by setting the second number of complex symbols equal to a second plurality of available resource elements in the time-frequency resource block, and mapping the second number of complex symbols to the second plurality of available resource elements, wherein the first and second numbers of complex symbols are integers, and the first number of complex symbols is less than the second number of complex symbols; and
    the at least one processor is further configured to send the first and second spreading blocks by using the transceiver of the communications interface.

5. The apparatus according to claim 4, wherein a ratio of the first number of complex symbols to the second number of complex symbols is greater than or equal to a first threshold.

6. The apparatus according to claim 4, wherein the at least one processor is configured to:
    send configuration information by using the communications interface, wherein the configuration information is used to configure the number of complex symbols.

7. An apparatus comprising:
    at least one processor in communication with a communications interface including a transceiver, wherein
    the at least one processor is configured to receive a first spreading block and a second spreading block by using the transceiver of the communications interface, the first spreading block comprising a first number of complex symbols mapped to a first plurality of available resource elements (RE) in a time-frequency resource block, and the second spreading block comprising a second number of complex symbols mapped to a second plurality of available resource elements (RE) in the time-frequency resource block, wherein the first and second numbers of complex symbols are integers, and the first number of complex symbols is less than the second number of complex symbols.

8. The apparatus according to claim 7, wherein a ratio of the first number of complex symbols to the second number of complex symbols is greater than or equal to a first threshold.

9. The apparatus according to claim 7, wherein the at least one processor is configured to:
    receive configuration information by using the communications interface; and configure the second number of complex symbols based on the configuration information.

* * * * *